United States Patent [19]
Tsuruoka et al.

[11] Patent Number: 6,156,846
[45] Date of Patent: Dec. 5, 2000

[54] FLEXIBLE POLYPROPYLENE RESINS, PROPYLENE BASES ELASTOMER COMPOSITIONS AND PROCESS FOR PRODUCTION OF OLEFIN POLYMERS

[75] Inventors: Masayuki Tsuruoka; Rikuo Onishi; Hideo Kusuyama; Akinobu Sugahara, all of Ichihara, Japan

[73] Assignee: Idemitsu Petrochemical Co., Ltd., Tokyo, Japan

[21] Appl. No.: 09/352,361

[22] Filed: Jul. 13, 1999

Related U.S. Application Data

[60] Division of application No. 08/991,536, Dec. 16, 1997, Pat. No. 6,001,933, which is a continuation-in-part of application No. 08/450,711, May 25, 1993, abandoned, which is a continuation of application No. 08/105,127, Aug. 12, 1993, abandoned, which is a division of application No. 07/730,807, Jul. 26, 1991, abandoned.

[30] Foreign Application Priority Data

| Nov. 28, 1989 | [JP] | Japan | 1-308573 |
| Nov. 29, 1989 | [JP] | Japan | 1-307519 |
| Feb. 8, 1990 | [JP] | Japan | 2-29266 |

[51] Int. Cl.$^7$ .................................................. C08L 23/12
[52] U.S. Cl. ............................ 525/240; 526/351
[58] Field of Search ............................ 525/240; 526/351

[56] References Cited

U.S. PATENT DOCUMENTS

| 3,013,003 | 12/1961 | Maragliano et al. . |
| 3,018,263 | 1/1962 | Schneider . |
| 3,492,372 | 1/1970 | Flanagan et al. . |
| 3,846,349 | 11/1974 | Harada et al. . |
| 4,395,519 | 7/1983 | Minami et al. . |
| 4,490,447 | 12/1984 | Battersby . |
| 4,504,617 | 3/1985 | Yui et al. . |
| 4,777,216 | 10/1988 | Busico et al. . |
| 4,822,840 | 4/1989 | Kioka et al. . |
| 4,892,851 | 1/1990 | Ewen et al. ............................ 502/104 |
| 5,023,300 | 6/1991 | Huff et al. . |
| 5,298,561 | 3/1994 | Cecchin et al. . |
| 5,428,127 | 6/1995 | Asanuma et al. ........................ 528/497 |
| 5,476,914 | 12/1995 | Ewen et al. ............................ 526/351 |
| 5,834,562 | 11/1998 | Silvestri et al. ........................ 525/240 |

FOREIGN PATENT DOCUMENTS

| 005896 | 12/1979 | European Pat. Off. . |
| 0119508 | 9/1984 | European Pat. Off. . |
| 2756486 | 6/1979 | Germany . |
| 42-022528 | 11/1967 | Japan . |
| 55-073741 | 6/1980 | Japan . |
| 59-122506 | 7/1984 | Japan . |
| 63-243106 | 10/1988 | Japan . |
| 63-243107 | 10/1988 | Japan . |
| 863414 | 3/1961 | United Kingdom . |

OTHER PUBLICATIONS

Lieberman, "Olefin Polymers (Polypropylene)", Kirk–Othmer Encyclopedia of Chemical Technology, 4$^{th}$ Ed., vol. 17, John Wiley & Sones, NY, p. 787 (1995).

Database WPI, Section Ch, Week 8846, Derwent Publications Ltd., London, GB; Class A17, AN 88–327834, Oct. 1988.

Polymer Bulletin 29, 199–203 (1992), Effect of 1–allyl–3, 4–dimethoxybenzene on propene polymerization with the $TiCl_4$/DBP (dibutylphthalate)$MgCl_2$ catalyst.

Ewen et al., J.Am.Chem.Soc., vol. 110, 6256–6258 (1988).

*Primary Examiner*—Donald R. Wilson
*Attorney, Agent, or Firm*—Antonelli, Terry, Stout & Kraus, LLP

[57] ABSTRACT

Disclosed are a flexible polypropylene resin suitable as thermoplastic elastomer, a propylene based elastomer composition containing the flexible polypropylene resin, and a process for producing the above flexible polypropylene resin and the propylene based elastomer composition. The above flexible polypropylene resin is composed of specific boiling heptane-soluble polypropylene and specific boiling heptane-insoluble polypropylene. The above propylene based elastomer composition comprises the above flexible polypropylene resin and an ethylene/propylene copolymer or an ethylene/propylene/polyene copolymer. The above process for the production of olefin polymers may be carried out by non-solvent polymerization methods such as a gas phase one-step polymerization method, and a gas phase multi-step polymerization method, using a specific catalyst.

12 Claims, 3 Drawing Sheets

FLEXIBLE POLYPROPYLENE RESINS, PROPYLENE BASES ELASTOMER COMPOSITIONS AND PROCESS FOR PRODUCTION OF OLEFIN POLYMERS

This application is a Divisional application of application Ser. No. 08/991,536, filed Dec. 16, 1997, U.S. Pat. No. 6,001,933 which is a Contiuntion-in-Part application of application Ser. No. 08/450,711, filed May 25, 1995, now abandoned the contents of which are incorporated herein by reference in their entirety, which is a Continuation application of application Ser. No. 08/105,127, filed Aug. 12, 1993, now abandoned which application is a Divisional application of application Ser. No. 07/730,807, filed Jul. 26, 1991, now abandoned which was filed as PCT International Application No. PCT/JP90/01216 on Sep. 21, 1990.

BACKGROUND OF THE INVENTION

The present invention relates to a novel, flexible polypropylene resin suitable as thermoplastic elastomer material, and a propylene based elastomer composition containing the polypropylene resin. The present invention also relates to a process for producing an olefin polymer, which may be suitably used for producing the above flexible polypropylene resin and the propylene based elastomer.

Thermoplastic elastomers have been widely used, as energy saving or resource saving type elastomers, for automotive parts, industrial machine parts, electric or electronic parts, construction materials, especially, as replacement for vulcanized rubbers.

In general, olefin based thermoplastic elastomers (TPO) have been produced by a process comprising blending polypropylene and an ethylene-propylene-diene rubber (EPDM) in the presence of peroxide. Such process is described in, for example, Japanese Patent Application Laid-open Gazette (Kokai) N. 61-217747. However, this process is disadvantageous since it requires complicated procedures and is a costly process.

On the other hand, several attempts have been made to lower the production cost, by directly polymerizing a high molecular weight polymer having dynamic properties similar to those of the above TPO. For example, Kokai 49-53983 and Japanese Patent Application Publication Gazette (Kokoku) No. 62-19444 propose a propylene-hexene copolymer, and Kokai 61-179247 proposes an elastomeric polypropylene. However, these polymers are inferior in low temperature properties.

Further, as a method of improving polypropylene in low temperature properties, a two-step propylene/ethylene-propylene polymerization is well known as described in, for example, Kokai 57-50804. However, it is difficult to produce vulcanized rubber like polymer having flexibility and tensile strength sufficient enough for practical use.

On the other hand, polypropylene has been produced using a Ziegler type catalyst. In this case, mainly crystalline isotactic polypropylene is produced with about 10 to 15% of atactic polypropylene as by-product. The atactic polypropylene has a low number average molecular weight (Mn) about 10,000, and thus are not suitable for practical use.

In the meanwhile, the present inventors found that atactic polypropylene having high molecular weight can be readily produced by polymerizing propylene using a catalyst system comprising combination of a solid catalyst component containing, as essential components, magnesium, titanium, a halogen atom and an electron donor; an organoaluminum compound; and an alkoxy group-containing aromatic compound (Kokai 63-243106). The atactic polypropylene is characterized by being soluble to boiling heptane; having a high molecular weight of, generally, 25,000 to 100,000; and having a relatively narrow molecular weight distribution. The atactic polypropylene has good melting properties as rubber like elastomer. However, the atactic polypropylene has poor mechanical strength, resulting in, when used alone, restriction in application for molded materials.

In view of the above situations, it is an object of the present invention to provide a flexible polypropylene resin having excellent dynamic properties as thermoplastic elastomer and having good cost performance, which can be used for, e.g., automotive parts, industrial machine parts, electric or electronic parts and construction materials.

It is another object of the present invention to provide a propylene based elastomer composition having, even without being vulcanized, tensile strength sufficient enough for practical use; having sufficient flexibility and low temperature properties; having low surface tackiness; and having good cost performance.

It is further object of the present invention to provide a process for producing an olefin polymer, which can be used for producing the above flexible polypropylene resin and the propylene based elastomer composition.

The present inventors made intensive studies to achieve the above objects, as a result of the studies, it was found that the above objects can be achieved by a flexible polypropylene containing, at a specific ratio, atactic polypropylene having specific molecular weight and specific molecular weight distribution and crystalline isotactic polypropylene having specific melt-index; and a flexible polypropylene containing, at a specific ratio, atactic polypropylene component having specific intrinsic viscosity and isotactic polypropylene having specific intrinsic viscosity.

Further, the present inventors found that an elastomer composition having physical properties similar to those of the TPO (partially cross-linked) can be obtained by the use of the above-mentioned specific flexible polypropylene homopolymers, even when they are not cross-linked.

Furthermore, the present inventors found that a vulcanized rubber like olefin polymer having physical properties similar to those of the TPO (partially cross-linked) can be obtained by the use of a specific catalyst system to control crystallinity of the resultant polymers, even when they are not cross-linked.

The present invention is based on the above findings.

SUMMARY OF THE INVENTION

Accordingly, the first embodiment of the present invention resides in:
(I) a flexible polypropylene comprising:
 (X) 10 to 90 weight % of boiling heptane soluble polypropylene having a number average molecular weight of not less than 25,000 and a molecular weight distribution (Mw/Mn) of not more than 7; and
 (Y) 90 to 10 weight % of boiling heptane insoluble polypropylene having a Melt Index of 0.1 to 4 g/10 min.; and
(II) a flexible polypropylene comprising:
 (x) 10 to 90 weight % of boiling heptane soluble polypropylene having an intrinsic viscosity of not less than 1.2 dl/g; and
 (y) 90 to 10 weight % of boiling heptane insoluble polypropylene having an intrinsic viscosity of 0.5 to 9.0 dl/g.

The second embodiment of the present invention resides in a propylene based elastomer composition which comprises:

(o) 10 to 95 weight % of a polypropylene based polymer comprising 10 to 90 weight % of boiling heptane soluble polypropylene having an intrinsic viscosity of not less than 1.2 dl/g and 90 to 10 weight % of boiling heptane insoluble polypropylene having an intrinsic viscosity of 0.5 to 9.0 dl/g; and 90 to 5 weight % of (p) an ethylene/propylene copolymer having an ethylene unit content of 10 to 60 mol % and an intrinsic viscosity of 0.5 to 7.0 dl/g, or (p') an ethylene/propylene/polyene copolymer having an ethylene unit content of 10 to 60 mol %, a polyene unit content of 1 to 10 mol %, and an intrinsic viscosity of 0.5 to 7.0 dl/g.

The third embodiment of the present invention resides in a non-solvent polymerization process for producing an olefin polymer, which employs a catalyst system comprising:

(A) a solid component composed of (a) crystalline polyolefin and (b) a solid catalyst component consisting of magnesium, titanium, a halogen atom and an electron donor;

(B) an organoaluminum compound;

(C) an alkoxy group-containing aromatic compound represented by the general formula:

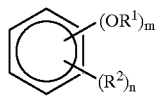

wherein $R^1$ is a $C_{1-20}$ alkyl group; $R^2$ is a $C_{1-10}$ hydrocarbon group, a hydroxyl group or a nitro group; m is an integer of 1 to 6; and n is 0 or an integer of 1 to (6−m); and (D) an electron donative compound.

In addition, an elastomeric polypropylene similar to the atactic polypropylene of the first embodiment is disclosed in Kokai 54-40889. However, the elastomeric polypropylene can only be produced by using an extremely unique catalyst having insufficient properties, although the the atactic polypropylene can be produced by using a conventional industrial catalyst for polypropylene.

DETAILED DESCRIPTION OF THE INVENTION

Figure 1:
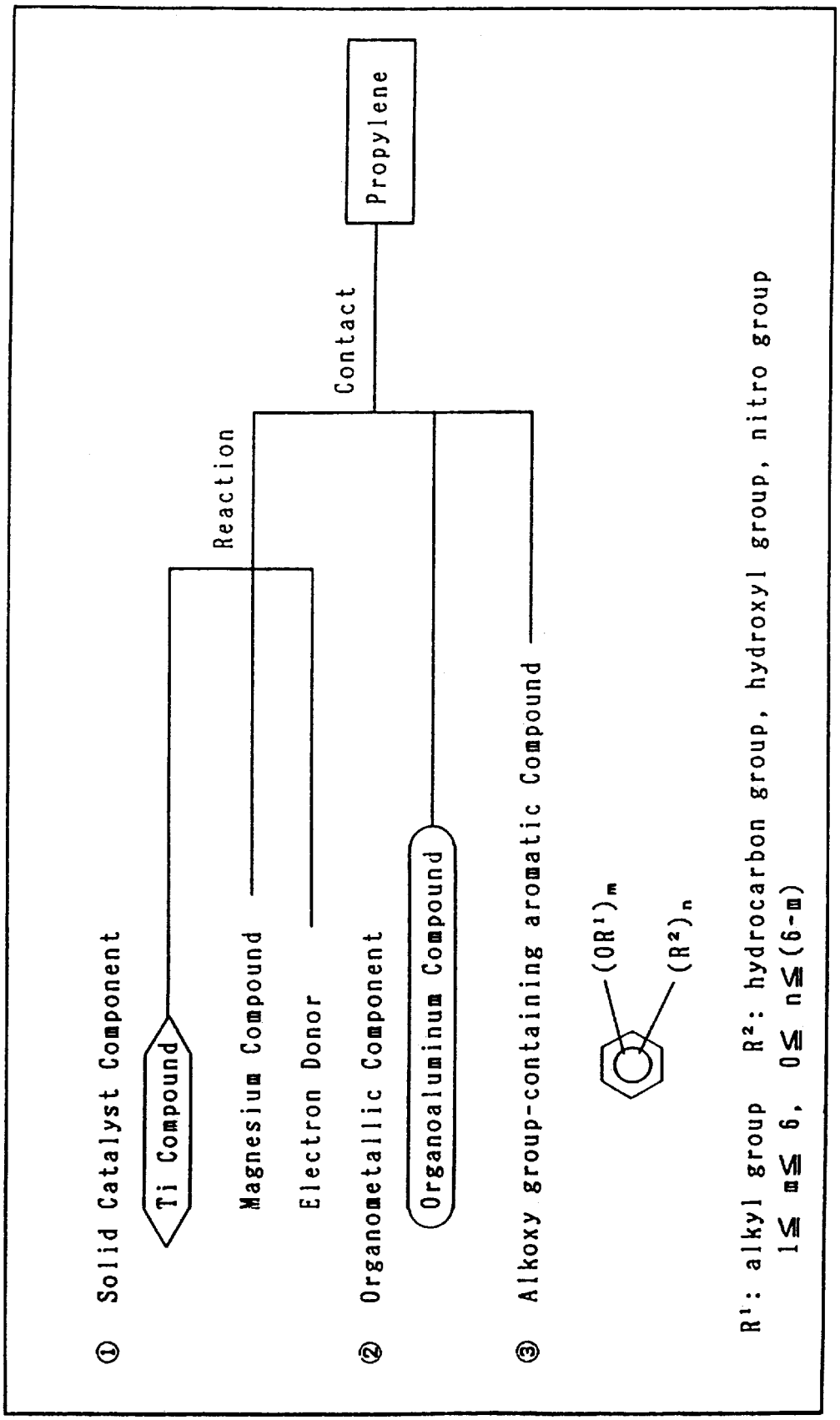
FIG. 1 is a flowchart showing one embodiment of a process for producing atactic polypropylene used as Component (X) of the flexible polypropylene of the present invention.

The present invention will be described below in more detail.

It is important that, for use in bumpers or sheets as thermoplastic elastomer, the flexible polypropylene resin (I) according to the first embodiment of the present invention should have an elongation at break ($T_B$) of 400% or more, preferably 500 to 700%; a remaining elongation after 100% elongation ($PS_{100}$) of 80% or less, preferably 50 to 75%; and a ratio ($M_B/M_Y$) of fracture stress ($M_B$) to yield stress ($M_Y$) of 1.0 or more, preferably 1.5 to 3.5. If these dynamic properties are outside of the above ranges, the objects of the present invention cannot be sufficiently achieved.

In the resin (I), the atactic polypropylene used as Component (X) should be one soluble to boiling heptane, having a number average molecular weight (Mn) of at least 25,000, preferably 30,000 to 60,000, and having a molecular weight distribution (Mw/Mn) of not more than 7, preferably 2 to 6. If the atactic polypropylene has a Mn of less than 25,000 or a Mw/Mn of more than 7, such atactic polypropylene cannot give improvement of dynamic properties caused by addition of atactic polypropylene to the resultant resin, resulting in low fracture stress ($M_B$)/yield stress ($M_Y$) ratio (e.g., less than 1.0) and more remaining elongation after 100% elongation ($PS_{100}$) (e.g., more than 80%). In this case, the objects of the present invention cannot be achieved.

The atactic polypropylene used as Component (X) may be a propylene homopolymer or a propylene copolymer having a propylene unit and not more than 40 wt. %, preferably not more than 30 wt. % of the other alpha-olefin having 2 to 30 carbon atoms. The atactic polypropylene can be used alone or in combination.

The atactic polypropylene, Component (X) can be produced by a known method as disclosed in, for example Kokai 63-243106. For example, desired atactic polypropylene can be obtained by polymerizing propylene in the presence of a catalyst comprising: (1) a solid catalyst component containing, as essential components, magnesium, titanium, a halogen atom and an electron donor; (2) an organoaluminum compound; and (3) an alkoxy group-containing aromatic compound represented by the general formula:

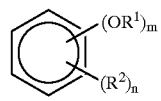

wherein $R^1$ is a $C_{1-20}$ alkyl group; $R^2$ is a $C_{1-10}$ hydrocarbon group, a hydroxyl group or a nitro group; m is an integer of 1 to 6; and n is 0 or an integer of 1 to (6−m). FIG. 1 shows one embodiment of a process for producing atactic polypropylene used as Component (X) of the flexible polypropylene of the present invention.

In addition, the ingredients for preparation of the catalyst according to the third embodiment of the present invention can be used to prepare the above catalyst.

With respect to the amount of each catalytic component, in general, Component (1) may be used in an amount to provide 0.0005 to 1 mmol per 1 liter of a reaction volume in terms of Ti atom. Component (2) may be used in an amount to provide a Component (2) to Ti mol ratio of 1 to 3,000, preferably 40 to 800. Component (3) may be used in an amount to provide a Component (3) to Ti mol ratio of 0.01 to 500, preferably 1 to 300.

In the process for producing the atactic polypropylene, the above-mentioned catalytic components may be added to a reaction system, and then propylene may be introduced into the reaction system. It is also possible to produce the atactic polypropylene by first blending and contacting the above Components (1), (2) and (3) in a desired amount, and, immediately after that, introducing propylene into the system to initiate polymerization. In this case, it is better to age the catalyst for 0.2 to 3 hours after the contact before introducing propylene.

Polymerization methods are not particularly limited, and can be carried out by any known methods such as a solution polymerization method, a suspension polymerization method and a gas phase polymerization method. The polymerization can be carried out batchwise or continuously. From the view point of efficiency and quality, the solution polymerization method and the suspension polymerization method are particularly preferred.

As for the reaction conditions for the polymerization reaction, the propylene pressure may usually range from 1 to 50 Kg/cm$^2$G; and the reaction temperature may usually range from 20 to 200° C., preferably from 60 to 100° C. The molecular weight of the resultant polymer can be controlled by any known method, for example, a method of controlling hydrogen concentration in a reactor. Usually the reaction time may range from 10 minutes to 10 hours.

Further, propylene as raw material can be used alone or, if desired, in combination with the other alpha-olefins. In this case, it is preferable that the alpha-olefin be used in amount of not more than 40 wt. %, preferably not more than 30 wt. %, based on the total weight of monomers used. Examples of the other alpha-olefins are $C_{2-30}$ alpha-olefins other than propylene, such as ethylene, butene-1, pentene-1, hexene-1, heptene-1, octene-1, nonene-1, decene-1, dodecene-1, tetradecene-1, octadecene-1, 4-methylpenetene-1, 4-methylehexene-1, 4,4-dimethylpentene-1 and the like. These alpha-olefins may be used alone or in combination with two or more kinds.

According to the above process, atactic polypropylene having high molecular weight and relatively narrow molecular weight distribution can be produced as Component (X) used in the flexible polypropylene resin (I).

In the resin (I), Component (Y) is boiling heptane insoluble, crystalline isotactic polypropylene having a Melt Index of 0.1 to 4 g/10 min. If the MI is less than 0.1 g/10 min., such isotactic polypropylene will have poor melting properties, resulting in difficulty in injection-molding. If the MI exceeds 4 g/10 min., such isotactic polypropylene will have insufficient mechanical properties and thus will not be suitable as molding material.

The isotactic polypropylene, Component (Y) may be a propylene homopolymer having isotactic stereoregularity, or a copolymer of propylene and the other alpha-olefin having isotactic stereoregularity. The suitable alpha-olefins which can be used in the copolymer may be those having 2 to 8 carbon atoms such as ethylene, butene-1, pentene-1, hexene-1, heptene-1 and octene-1. Of these, ethylene and butene-1 are more preferred. The copolymer may be a block copolymer or a random copolymer which usually contains not more than 40 wt. %, preferably not more than 30 wt. % of the other alpha-olefin.

Suitable isotactic polypropylene, Component (Y) includes, for example, a propylene homopolymer and a random or block copolymer of propylene and ethylene, having an ethylene unit content of 1 to 30 wt. %, preferably 3 to 25 wt. %. A process for producing such isotactic polypropylene is not particularly limited; but can be selected from known methods conventionally used to produce crystalline polypropylene.

In the flexible polypropylene resin (I) according to the present invention, the isotactic polypropylene, Component (Y) can be used alone or in combination. Further, the atactic polypropylene, Component (X) and the isotactic polypropylene, Component (Y) may be used to provide a Component (X) content of 10 to 90 wt. %, preferably 25 to 80 wt. % and a Component (Y) content of 90 to 10 wt. %, preferably 75 to 20 wt. %. If the content of Component (X) is less than 10 wt. %, the resultant resin has too big yield stress ($M_Y$), resulting in fracture stress ($M_B$) to yield stress ($M_Y$) ratio ($M_B/M_Y$) of less than 1.0, and a remaining elongation ($PS_{100}$) after 100% elongation of more than 80%. In this case, the objects of the present invention cannot be achieved. On the other hand, if the content of Component (X) exceeds 90 wt. %, the resultant resin has poor fracture stress ($M_B$), resulting in $M_B/M_Y$ ratio of less than 1.0 and lowered mechanical strength. In this case, also the objects of the present invention cannot be achieved.

Next, flexible polypropylene resin (II) will be described.

The flexible polypropylene resin (II) contains a boiling heptane soluble polypropylene having an intrinsic viscosity of 1.2 dl/g or more, preferably 1.5 dl/g or more; and a boiling heptane insoluble polypropylene having an intrinsic viscosity of 0.5 to 9.0 dl/g, preferably 1.0 to 6.0 dl/g. It is necessary that the polypropylene resin (II) have a boiling heptane soluble polypropylene content of 10 to 90 wt. %, preferably 25 to 70 wt. %; and a boiling heptane insoluble polypropylene content of 90 to 10 wt. %, preferably 75 to 30 wt. %.

If the boiling heptane soluble polypropylene has an intrinsic viscosity of less than 1.2 dl/g, the resultant resin will have poor fracture stress, resulting in loss of rubber elastomeric properties. If the boiling heptane soluble polypropylene content is less than 10 wt. %, the resultant resin may have poor flexibility. If the boiling heptane soluble polypropylene content is more than 90 wt. %, the resultant resin will have a tendency to have insufficient mechanical properties.

On the other hand, if the boiling heptane insoluble polypropylene has an intrinsic viscosity of less than 0.5 dl/g, the resultant resin will have extremely poor impact strength. If the boiling heptane insoluble polypropylene has an intrinsic viscosity of more than 9.0 dl/g, the resultant resin will have a tendency to have difficulty in molding. In addition, the intrinsic viscosity should be value measured in a decaline solution at 135° C.

The flexible polypropylene resin (II) according to the present invention preferably has a pentad fraction (rrrr/(1-mmmm)), measured by $^{13}$C-NMR, expressed as a percentage, of 20% or more; a melting peak temperature (Tm), measured by DSC, of 150° C. or more; and an enthalpy of melting (ΔH) of 100 J/g or less. The resin having a pentad fraction of less than 20%, will have poor impact strength at low temperature. The resin having a melting peak temperature of less than 150° C. will have insufficient heat resistance. The resin having an enthalpy of melting of more than 100 J/g will have poor flexibility. In any of these cases, the resultant resin may have insufficient physical properties as thermoplastic elastomer. Further, in the flexible polypropylene resin (II) according to the present invention, a domain structure can usually be observed by a transmission type electron microscope.

The flexible polypropylene resin of the present invention may contain, if desired, various additives, reinforcing agents, fillers, such as heat stabilizers, antioxidants, photo stabilizers, antistatic agents, lubricants, nucleating agents, flame retarding agents, pigments, dyes, glass fibers, carbon fibers, calcium carbonate, calcium sulfate, mica, talc and clay. These additives can be added as far as the objects of the present invention can be achieved. Further, it is possible to add the other thermoplastic resins, thermoplastic elastomers, rubbers and the like to the polypropylene resin of the present invention, if desired.

Next, the propylene based elastomer composition according to the second embodiment of the present invention, will be described.

The composition according to the second embodiment contains 10 to 95 wt. %, preferably 40 to 80 wt. % of a polypropylene based polymer (o), based on the total weight of the composition. The composition containing less than 10 wt. % of the polypropylene based polymer (o), will have remarkably lowered heat resistance. The composition containing more than 95 wt. % of the polymer (o), will have remarkably lowered impact strength at low temperature.

The polypropylene based polymer (o) is the same as the flexible polypropylene resin (II) according to the first embodiment of the present invention. The favorable physical properties of the polypropylene based polymer (o) are the same as those of the polypropylene resin (II).

The composition according to the second embodiment of the present invention has 5 to 90 wt. %, preferably 20 to 60 wt. % of an ethylene/propylene copolymer (p) or an ethylene/propylene/diene copolymer (p') based on the total amount of the composition. Each of the copolymers (p) and (p') has an ethylene unit content of 10 to 60 mol %, preferably 20 to 50 mol %. If the ethylene unit content is less than 10 mol %, the resultant composition has remarkably poor impact strength at low temperature. If the ethylene unit content is more than 60 mol %, the resultant composition will have poor surface gloss. The copolymers (p) and (p') have an intrinsic viscosity of 0.5 to 7.0, preferably 1.0 to 3.0 dl/g. If the intrinsic viscosity is less than 0.5 dl/g, the resultant composition will have remarkably lowered impact strength at low temperature. If the intrinsic viscosity exceeds 7.0 dl/g, the resultant composition will have poor surface gloss and poor surface impact strength.

The elastomer composition according to the the second embodiment of the present invention which consists of the polypropylene based polymer (o) and the copolymer (p) or (p'), preferably has an elongation at break of 300% or more, preferably 400% or more; a fracture stress of 100 Kg/cm$^2$ or more, preferably 150 Kg/cm$^2$ or more; and a tensile elasity of 8000 Kg/cm$^2$ or less, preferably 5000 Kg/cm$^2$ or less.

The elastomer compositions having an elongation at break of less than 300% or a fracture stress of less than 100 Kg/cm$^2$, are not preferable since they do not have rubber elastomeric properties. The elastomer compositions having a tensile elasity of more than 8000 Kg/cm$^2$ are not preferable since they do not have low hardness.

Next, a process for producing a olefin polymer according to the third embodiment of the present invention, will be described.

Firstly, a catalyst system will be described.

In the catalyst system according to the third embodiment of the present invention, a solid component (A) comprises crystalline polyolefin (A-a); and solid catalyst component (A-b) containing magnesium, titanium, a halogen atom and an electron donor.

The preparation methods of the solid component (A) include, for example:

(1) a method comprising pre-polymerizing an olefin in the presence of a mixture of the solid catalyst component (A-b), an organoaluminum compound and an electron donative compound to be used when desired (Pre-Polymerization Method);

(2) a method which comprises dispersing the solid catalyst component (A-b), an organoaluminum compound and an electron donative compound (melting point: 100° C. or more) which are used when desired, in a crystalline powder such as crystalline polypropylene and polyethylene having an uniformed particle size (Dispersion Method); and (3) A method combining the method (1) and the method (2).

The crystalline polyolefin (A-a) used in the solid component (A) include, for example, crystalline polyolefins obtained from alpha-olefins having 2 to 10 carbon atoms, such as polyethylene, polypropylene, polybutene, and poly-4-methylpentene. The crystalline polyolefin (A-a) can be prepared by pre-polymerization as indicated in the method (1). That is, alpha-olefins having 2 to 10 carbon atoms may be subjected to pre-polymerization usually at 30 to 80° C., preferably at 55 to 70° C.

In this case, an aluminum to titanium atomic ratio in the catalyst system may be usually selected from a range of 0.1 to 100, preferably 0.5 to 5; and an electron donor to titanium molar ratio may be selected from a range of 0 to 50, preferably 0.1 to 2. In addition, as crystalline polyolfin (A-a), the crystalline polyolefin powders so produced by the preparation method (2) can be used.

In addition, the crystalline polyolefins suitably have a melting point of 100° C. or more.

The organoaluminum compound which can be used to prepare the solid component (A), may be selected from those for the component (B) described later. Further, the electron donative compounds to be used when desired, may be selected from those for the component (D) described later.

The solid catalyst component (A-b) used to prepare the solid component (A) should contain magnesium, titanium, a halogen atom and an electron donor as essential components. The solid catalyst component (A-b) can be prepared by contacting a magnesium compound, a titanium compound and an electron donor. In this case, a halogen atom may be contained in the magnesium compound and/or the titanium compound as halogenated compound.

Examples of the magnesium compounds include magnesium dihalides such as magnesium dichloride; magnesium alkoxides such as magnesium oxide, magnesium hydroxide, hydrotalcite, salts of carboxylic acids of magnesium and magnesium diethoxide; aryloxymagnesium; alkoxymagnesium halide; aryloxymagnesium halide; alkylmagnesium such as ethylbutylmagnesium; alkylmagnesium halide; and a reaction product of an organomagnesium compound and an electron donor, halosilane, alkoxysilane, silanol or an aluminum compound. Of these compounds, magnesium halides, alkoxymagnesium, alkylmagnesium, alkylmagnesium halides are preferred. In addition, these magnesium compounds can be used alone or in combination.

As the magnesium compounds, a reaction product of metallic magnesium, alcohol and halogen can be used. The metallic magnesium can be in any form, such as granule, ribbon and powders. Also, the metallic magnesium should preferably be free of magnesium oxide film covering it, although no specific restrictions are placed on its surface state.

The alcohol is not specifically limited; but it should preferably be a lower alcohol having 1 to 6 carbon atoms. Ethanol is most desirable, because it gives a solid catalyst component which greatly improves the catalyst performance. The alcohol may have any purity and water content which are not specifically limited. It is desirable, however, that the water content should be 1% or lower, preferably 2000 ppm or lower, because excess water in the alcohol forms magnesium hydroxide on the surface of metallic magnesium. Moreover, the water content should preferably be as low as possible, usually 200 ppm or lower. Further, suitable halogen includes bromine and iodine. The halogen may be used in any form and state. For example, it may be used in the form of solution in an alcohol.

The amount of the alcohol usually ranges from 2 to 100 mol, preferably from 5 to 50 mol, per 1 mol of the metallic magnesium. An excess amount of alcohol is likely to give the magnesium compound having poor morphology. With too small an amount of alcohol, it is difficult to carry out smooth stirring in the reaction vessel. The halogen should be used in an amount of at least 0.0001 gram-atom, preferably at least 0.0005 gram-atom, most preferably at least 0.001 gram-atom, per 1 mol of the metallic magnesium. With an amount less than 0.0001 gram-atom, without grinding, the magnesium compound is poor in titanium-supporting capacity, stereoregularity, and morphology. In this case, grinding of the magnesium compound is required; however, this is an additional step and not preferable. The amount of the halogen has no upper limit so long as the desired magnesium compound is obtained. It is possible to control the particle size of the resulting magnesium compound by appropriately selecting the amount of halogen used.

The reaction of metallic magnesium, alcohol, and halogen may be carried out by any known method. For example, the reaction may be carried out under reflux conditions for usually 2 to 30 hours until the reaction system does not evolve hydrogen gas any longer, to obtain a desired magnesium compound. More specifically, such known methods using iodine as halogen include:

(1) A method which comprises adding iodine in solid form to a mixture of alcohol and metallic magnesium, and reacting them under refluxing by heating;

(2) A method which comprises adding an alcohol solution of iodine dropwise to a mixture of alcohol and metallic magnesium, and reacting them under refluxing by heating; and (3) A method which comprises adding an alcohol solution of iodine dropwise to a mixture of alcohol and metallic magnesium while heating the mixture.

Regardless of the method selected, the reaction should preferably be carried out in an inert gas atmosphere such as nitrogen and argon and, if necessary, in the presence of an inert organic solvent such as saturated hydrocarbons such as n-hexane. It is not necessary to place the metallic magnesium, alcohol, and halogen all at once in the reaction vessel. It is possible to place them by portions in the reaction vessel. For example, It is possible to place all of the alcohol in the reaction vessel at the beginning and then to add metallic magnesium by portions several times. This procedure prevents the reaction system from evolving hydrogen gas in a large amount at one time and hence ensures safety and permits the use of a smaller reaction vessel, without the partial loss of alcohol and halogen by splashing. The number of portions should be properly determined according to the size of the reaction vessel; but it is usually 5 to 10 to avoid unnecessary complexity.

The reaction may be carried out batchwise or continuously. There is a modified method which comprises repeating the steps of adding a small portion of metallic magnesium to as much alcohol as necessary placed in a reaction vessel and removing the reaction product.

The obtained magnesium compound can be used as such in the next step without necessity for grinding or classification for a desired particle size distribution.

The titanium compounds include, for example, titanium tetraalkoxides such as titanium tetramethoxide, titanium tetraethoxide, titanium tetra-n-propoxide, titanium tetraisopropoxide, titanium tetra-n-butoxide, titanium tetraisobutoxide, titanium tetrahexyloxide and titanium tetraphenoxide; titanium tetrahalides such as titanium tetrachloride, titanium tetrabromide and titanium tetraiodide; alkoxytitanium trihalides such as methoxytitanium trichloride, ethoxytitanium trichloride, propoxytitanium trichloride, n-butoxytitanium trichloride and ethoxytitanium tribromide; dialkoxytitanium dihalides such as dimethoxytitanium dichloride, diethoxytitanium dichloride, dipropoxytitanium dichloride, di-n-propoxytitanium dichloride and diethoxytitanium dibromide; and trialkoxytitanium monohalides such as trimethoxytitanium chloride, triethoxytitanium chloride, tripropoxytitanium chloride and tri-n-butoxytitanium chloride. Of these, preferred are higher halogenated titanium compound, particularly titanium tetrachloride. These titanium compounds can be used alone or in combination.

Further, the halogen atoms include a fluorine atom, chlorine atom, bromine atom and iodine atom. These halogen atoms are usually contained in the magnesium compounds and/or the titanium compounds.

In addition, as electron donors, those which will be described later for component (D) can be used.

The above solid catalyst component (A-b) can be prepared by any known processes as described in, for example, Kokai 53-43094; 55-135102; 55-135103; and 56-18606. The known processes include:

(1) a process comprising grinding a magnesium compound or a complex of a magnesium compound and an electron donor compound in the presence of an electron donor compound and, if desired, a grinding promoter, and then reacting the ground mixture with halogenated titanium;

(2) a process comprising reacting a magnesium compound in the form of liquid, having no reduction capability, with liquid halogenated titanium in the presence of an electron donor compound to precipitate a titanium complex in a solid form;

(3) a process comprising further reacting the resultant product of Process (1) or (2) with halogenated titanium;

(4) a process comprising further reacting the resultant product of Process (1) or (2) with an electron donor compound and halogenated titanium;

(5) a process comprising grinding a magnesium compound or a complex of a magnesium compound and an electron donor compound in the presence of an electron donor compound, a titanium compound and, as desired, a grinding promoter, and then treating the ground mixture with halogen or a halogen compound.

(6) a process comprising treating the compounds obtained in any one of Process (1) to (4) with halogen or a halogenated compound.

Further, the solid catalyst component (A-b) can be prepared by process other than those mentioned above, for example, those described in Kokai 56-166205; 57-63309; 57-190004; 57-300407; and 58-47003.

In addition, the solid catalyst component (A-b) can be prepared by a process which comprises contacting an oxide of elements belonging to the II to IV Groups of the Periodic Table (such as silicon oxide, magnesium oxide and aluminum oxide), or oxide complex containing at least one oxide of elements belonging to the II to IV Groups of the Periodic Table (such as a solid product wherein the above magnesium compound is carried on silica-alumina), with an electron donor compound and halogenated titanium in a solvent at 0 to 200° C., preferably 10 to 150° C. for 2 minutes to 24 hours.

The preparation of the solid catalyst component (A-b) can be carried out in a solvent inert to the magnesium compound, the electron donor compound and the halogenated titanium. Such inert solvents include aliphatic hydrocarbons such as hexane and heptane; aromatic hydrocarbons such as benzene and toluene; halogenated hydrocarbons such as mono- and polyhalogen compounds of fatty, cyclic or aromatic hydrocarbons, which may be saturated or unsaturated, having 1–12 carbon atoms.

In general, the thus prepared solid catalyst compound (A-b) has a magnesium to titanium atomic ratio of 2 to 100; a halogen to titanium atomic ratio of 5 to 200 and an electron donor to titanium molar ratio of 0.1 to 10.

In the above solid component (A), the ratio of the crystalline polyolefin (A-a) and the solid catalyst component (A-b) is such that a component (A-b)/component (A-a) ratio generally ranges from 0.033 to 200, preferably from 0.10 to 50.

The organoaluminum compounds (B) which can be used in the catalyst system used in the third embodiment of the present invention, are represented by the following formula:

wherein $R^3$ is an alkyl group having 1–10 carbon atoms; and X is a halogen atom such as chlorine or bromine; and p is an integer of 1 to 3. Examples of the aluminum compound include trialkylaluminum such as trimethylaluminum, triethylaluminum, triisopropylaluminum, triisobutylaluminum and trioctylaluminum; and dialkylaluminum monohalide such as diethylaluminum monochloride, diisopropylaluminum monochloride, diisobutylaluminum monochloride and dioctylaluminum monochloride; and alkylaluminum sesquihalide such as ethylaluminum sesquichloride. These organoaluminum compounds may me used alone or in combination.

The alkoxy group-containing aromatic compounds (C), which are used in the catalyst system of the third embodiment of the present invention, are represented by the general formula:

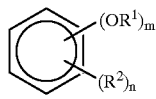

wherein $R^1$ is an alkyl group having 1 to 20 carbon atoms; $R^2$ is a hydrocarbon having 1 to 10 carbon atoms, hydroxyl group or nitro group; m is an integer of 1 to 6; and n is an integer of 0 to (6−m). The aromatic compounds (C) include, for example, monoalkoxy compounds such as m-methoxytoluene, o-mehtoxyphenol, m-methoxyphenol, 2-methoxy-4-methylphenol, vinylanisole, p-(1-propenyl) anisole, p-allylanisole, 1,3-bis(p-methoxyphenyl)-1-pentene, 5-allyl-2-methoxyphenol, 4-allyl-2-methoxyphenol, 4-hydroxy-3-methoxybenzylalcohol, methoxybenzylalcohol, nitroanisole and nitrophenetole; dialkoxy compounds such as o-dimethoxybenzene, m-dimethoxybenzene, p-dimethoxybenzene, 3,4-dimethoxytoluene, 2,6-dimethoxyphenol and 1-allyl-3,4-dimethoxybenzene; trialkoxy compounds such as 1,3,5-trimethoxybenzene, 5-allyl-1,2,3-trimethoxybenzene, 5-allyl-1,2,4-trimethoxybenzene, 1,2,3-trimethoxy-5-(1-propenyl)benzene, 1,2,4-trimethoxy-5-(1-propenyl) benzene, 1,2,3-trimethoxybenzene and 1,2,4-trimethoxybenzene. Of these, preferred are dialkoxy compounds and trialkoxy compounds. These alkoxy group-containing compounds can be used alone or in combination.

The electron donor compounds (D) used in the catalyst system of the third embodiment of the present invention, are compounds containing oxygen, nitrogen, phosphorus, sulfur, silicon and the like. Basically, the compounds that can improve stereoregurality in propylene polymerization are considered to be useful.

The electron donor compounds (c) include, for example, organosilicon compounds, esters, thioester, amines, ketones, nitriles, phosphines, etheres, thioethers, acid anhydrides, acid halides, acid amides, aldehydes and organic acids.

Further, the electron donor compounds include, for example, organosilicon compounds such as diphenyldimethoxysilane, diphenyldiethoxysilane, dibenzyldimethoxysilane, tetramethoxysilane, tetraethoxysilane, tetraphenoxysilane, methyltrimethoxysilane, methyltriethoxysilane, methyltriphenoxysilane, phenyltrimethoxysilane, phenyltriethoxysilane and benzyltrimethoxysilane; esters of aromatci dicarboxylic acid such as n-butylphthalate and diisobutylphthalate; $C_{1-4}$ alkyl esters of aromatic monocarboxylic acids such as benzoic acid, p-methoxybenzoic acid, p-ethoxybenzoic acid and toluic acid; non-symmetric ethers such as isopropyl methyl ether, isopropyl ethyl ether, t-butyl methyl ether, t-butyl ethyl ether, t-butyl n-propyl ether, t-butyl n-butyl ether, t-amyl methyl ether and t-amyl ethyl ether; azo compounds where a steric hindrance substituent is bonded to an azo bond, such as 2,2'-azobis(2-methylpropane), 2,2'-azobis(2-ethylpropane), 2,2'-azobis(2-methylpentane), alpha,alpha'-azobisisobutylonitrile, 1,1'-azobis(1-cyclohexanecarboxylic acid), (1-phenylmethyl)-azodiphenylmethane and 1-phenylazo-2,4-dimethyl-4-trixypentanenitrile. These compounds can be used alone or in combination.

More specifically, the electron donor compounds include, for example, di-esters of aromatic dicarboxylic acids such as diethyl phthalate, diethyl phthalate, dipropyl phthalate, diisobutyl phthalate, methyl ethyl phthalate, methylpropyl phthalate, methyl isobutyl phthalate, ethyl propyl phthalate, ethyl isobutyl phthalate, propyl isobutyl phthalate, dimethyl terephthalate, diethyl terephthalate, dipropyl terephthalate, diisobutyl terephthalate, methyl ethyl terephthalate, methyl propyl terephthalate, methyl isobutyl terephthalate, ethyl propyl terephthalate, ethyl isobutyl terephthalate, propyl isobutyl terephthalate, dimethyl isophthalate, diethyl isophthalate, dipropyl isophthalate, diisobutyl isophthalate, methyl ethyl isophthalate, methyl propyl isophthalate, methyl isobutyl isophthalate, ethyl propyl isophthalate, ethyl isobutyl isophthalate and propyl isobutyl isophthalate;

mono-esters such as methyl formate, ethyl acetate, vinyl acetate, propyl acetate, octyl acetate, cyclohexyl acetate, ethyl propionate, ethyl acetate, ethyl valerate, methyl chloroacetate, ethyl dichloroacetate, methyl methacrylate, ethyl crotonate, ethyl pivalate, dimethyl maleate, ethyl cyclohexanecarboxylate, ethyl benzoate, propyl benzoate, butyl benzoate, octyl benzoate, cyclohexyl benzoate, phenyl benzoate, benzyl benzoate, ethyl toluate, amyl toluate, ethyl ethylbenzoate, ethyl anisate, ethyl p-butoxybenzoate, ethyl o-chlorobenzoate and ethyl naphthoate; esters having 2 to 18 carbon atoms such as gamma-valerolactone, coumarin, phthalide and ethylene carbonate;

aromatic carboxylic acids such as benzoic acid and p-oxybenoic acid;

acid anhydrides such as succinic acid anhydride, benzoic acid anhydride and p-toluic acid anhydride;

ketones having 3–15 carbon atoms such as acetone, methyl ethyl ketone, methyl isobutyl ketone, acetophenone, benzophenone and benzoquinone;

aldehydes having 2–15 carbon atoms such as acetaldehyde, octyl aldehyde, benzaldehyde, tolualdehyde and naphthaldehyde;

acid halides having 2–15 carbon atoms such as acetyl chloride, benzyl chloride, toluic acid chloride and anisic acid chloride;

ethers having 2–20 carbon atoms such as methyl ether, ethyl ether, isopropyl ether, ter.-butyl methyl ether, ter.-butyl ethyl ether, n-butyl ether, amyl ether, tetrahydrofuran, anisole, diphenyl ether, ethylene glycol butyl ether;

acid amides such as acetic acid amide, benzoic acid amide and toluic acid amide;

amines such as tributyl amine, N,N'-dimethylpiperazine, 2,2,6,6-tetramethylpiperidine, tribenzylamine, aniline, pyridine, pycoline and tetramethyl ethylene diamine; and nitriles such as acetonitrile, benzonitrile, tolunitrile.

Of these compounds, preferred are organosilicon compounds, esters, ethers, ketones and acid anhydrides. Particularly preferred are organosilicon compounds such as diphenyldimethoxysilane and phenyltriethoxysilane; di-esters of aromatic dicarboxylic acids such as di-n-butyl phthalate and diisobutyl phthalate; and $C_{1-4}$ alkyl esters of aromatic monocarboxylic acid such as benzoic acid, p-methoxybenzoic acid, p-ethoxybenzoic acid and toluic acid. The di-esters of aromatic dicarboxylic acids are particularly preferred since they can improve a catalytic activity and activity durability.

In the third embodiment of the present invention, each component of the catalyst is used in the following amounts. The solid catalyst component (A) may be used in an amount of from 0.0005 to 1 mmol per 1 liter of a reaction volume, in terms of titanium atom. The organoaluminum compound, Component (B), may preferably be used in an amount to provide an Al/Ti atomic ratio of 1 to 3000, more preferably from 40 to 800. The use of the ranges outside of the atomic ratio will result in poor catalytic activity. The alkoxy group-containing aromatic compound may preferably be used in an amount to provide an aromatic compound/titanium molar ratio of 0.1 to 500, more preferably 1 to 300. The use of the molar ratio less than 0.1 will result in poor physical properties of the resultant polymers. The molar ratio more than 500 may result in poor catalytic activity. The electron donor compounds (D) may be used in an amount to provide a compound (C)/compound (D) molar ratio of usually 0.01 to 100, preferably 0.2 to 100.

The process for the production of olefin polymers using the above-mentioned catalyst system of the present invention will be described below.

In the embodiment of the present invention, at least one alpha-olefin is polymerized in the presence of the above-mentioned catalyst system, to produce alpha-olefin homopolymers such as propylene homopolymer or alpha-olefin copolymers such as propylene/alpha-olefin random copolymers and ethylene/propylene block copolymers.

Examples of the alpha-olefins used as starting materials are those having 2 to 30 carbon atoms, such as ethylene, propylene, butene-1, pentene-1, 4-methylpentene-1, heptene-1, nonene-1 and decene-1. These olefins can be used alone or in combination.

As to the type of polymerization, a non-solvent polymerization method such as gas phase polymerization or bulk polymerization can be used. The gas phase polymerization is preferably used.

The gas phase polymerization includes a gas phase one-step polymerization method where the polymerization is carried out in one step; and a gas phase multi-step polymerization method. The gas phase one-step method is used to produce alpha-olefin homopolymers such as propylene homopolymers, propylene/alpha-olefin random copolymers, and the like. The gas phase multi-step method is used to produce ethylene/propylene block copolymers, ethylene/propylene/polyene block terpolymers, and the like.

The reaction conditions for the gas phase one-step polymerization method are such that the polymerization pressure may usually range from 10 to 45 $Kg/cm^2 \cdot G$, preferably 20 to 30 $Kg/cm^2 \cdot G$, and the polymerization temperature may usually range from 40 to 90° C., more preferably 60 to 75° C. The molecular weight of the resultant polymer can be controlled by any known methods, for example, a method of controlling hydrogen concentration in a reactor. The reaction time may vary depending upon kinds of olefins, reaction temperature and the like, and cannot be readily specified. Usually the reaction time may range from 5 minutes to 10 hours.

In the case of polymerization by the gas phase one-step method, suitable alpha-olefins as starting materials are propylene for production of homopolymers; propylene and $C_{4-30}$alpha-olefins for production of copolymers. In the case of copolymerization, a propylene/alpha-olefin molar ratio is preferably 0.2 to 20.

In the case of polymerization by the gas phase multi-step polymerization method, the first polymerization may be homopolymerization or copolymerization of alpha-olefins (preferably homopolymerization of propylene or copolymerization of propylene and $C_{4-30}$ alpha-olefins). The molecular weight control can be made by a known method such as hydrogen gas concentration control. The polymerization temperature may usually range from 40 to 90° C., more preferably 60 to 75° C. The polymerization pressure may usually range from 10 to 45 $Kg/cm^2 \cdot G$, preferably 20 to 30 $Kg/cm^2 \cdot G$. The reaction time may range from 5 minutes to 10 hours.

The second to final (n-step) polymerization may be copolymerization of ethylene/propylene or ethylene/propylene/polyene.

Suitable polyenes include, for example, non-conjugated polyenes such as dicyclopentadiene, tricyclopentadiene, 5-methyl-2,5-norbornadiene, 5-methylene-2-norbornene, 5-ethylidene-2-norbornene, 5-isopyridene-2-norbornene, 5-isopropenyl-2-norbornene, 5-(1-butenine)-2-norbornene, cyclooctadiene, vinylcyclohexane, 1,5,9-cyclododecatoriene, 6-methyl-4,7,8,9-tetrahydroindene, 2,2'-dicyclopentenyl, trans-1,2-divinylcyclobutane, 1,4-hexadiene, 4-methyl-1,4-hexadiene, 1,6-octadiene, 1,7-octadiene, 1,8-nonadiene, 1,9-decadiene, 3,6-dimethyl-1,7-octadiene, 4,5-dimethyl-1,7-octadiene, 1,4,7-octatriene, 5-methyl-1,8-nonadiene, norbornadiene and vinylnorbornene. Of these non-conjugated polyenes, particularly preferred are dicyclopentadiene, 5-ethylidene-2-norbornene and 1,7-octadiene.

In each polymerization step, molecular weight control can be made by a known method such as hydrogen gas concentration control. In the case of an ethylene/propylene copolymer, the control of ethylene unit content can be made by controlling a gas ratio of gas used. In the case of ethylene/propylene/polyene copolymers, the control of the polyene unit content can be made by controlling the amount of the polyene compounds used. The polymerization temperature may usually range from 20 to 90° C., more preferably 40 to 50° C. The polymerization pressure may usually range from 5 to 30 $Kg/cm^2 \cdot G$, preferably 10 to 20 $Kg/cm^2 \cdot G$. The reaction time may range from 5 minutes to 10 hours.

In addition, according to the above gas phase multi-step polymerization method, and ethylene/propylene block copolymer, and ethylene/propylene/polyene block terpolymer and the like can be produced.

In the above-mentioned polymerization, immediately after components (A) to (D) are mixed at a prescribed ratio and contacted with each other, an olefin may be introduced to initiate the polymerization. To age the catalyst components, it is possible to introduce olefin into a reactor, 0.2 to 3 hours after such contact of catalyst components. Further, it is possible to supply the catalyst components suspended in an inert solvent or an olefin.

In the third embodiment of the present invention, post treatment after polymerization can be conducted by any known methods. In the case of a gas phase polymerization, the resultant polymer powders supplied from a polymerization reactor may be treated with nitrogen stream to remove olefins contained in the polymer powders. If desired, the resultant polymer powders may be pelletized. During the pelletization, a small amount of water, alcohol or the like may be added to the powders in order to completely inactivate the catalyst. Further, in the case of bulk polymerization, after polymerization, remaining monomers may be removed completely from the resultant polymer and then the polymer may be pelletized.

There will be described a process for producing the flexible polypropylene resin of the first embodiment of the present invention and the propylene based elastomer of the second embodiment of the present invention.

More specifically, the flexible polypropylene resin can be produced by the following gas phase one-step polymerization method, and the propylene based elastomer can be produced by the following gas phase two-step method with good results.

Further, the flexible polypropylene resin can be produced by the following slurry one-step polymerization method or blending method (I). The propylene based elastomer can be produced by the following slurry multi-step polymerization method or blending method (II).

Gas Phase One-Step Polymerization Method

In a gas phase one-step method, propylene monomers are polymerized in the presence of the catalyst according to the above third embodiment of the present invention, to produce a desired flexible polypropylene resin. In this case, suitable polymerization conditions and a molecular weight weight control method are as described before for the third embodiment of the present invention.

Figure 2:
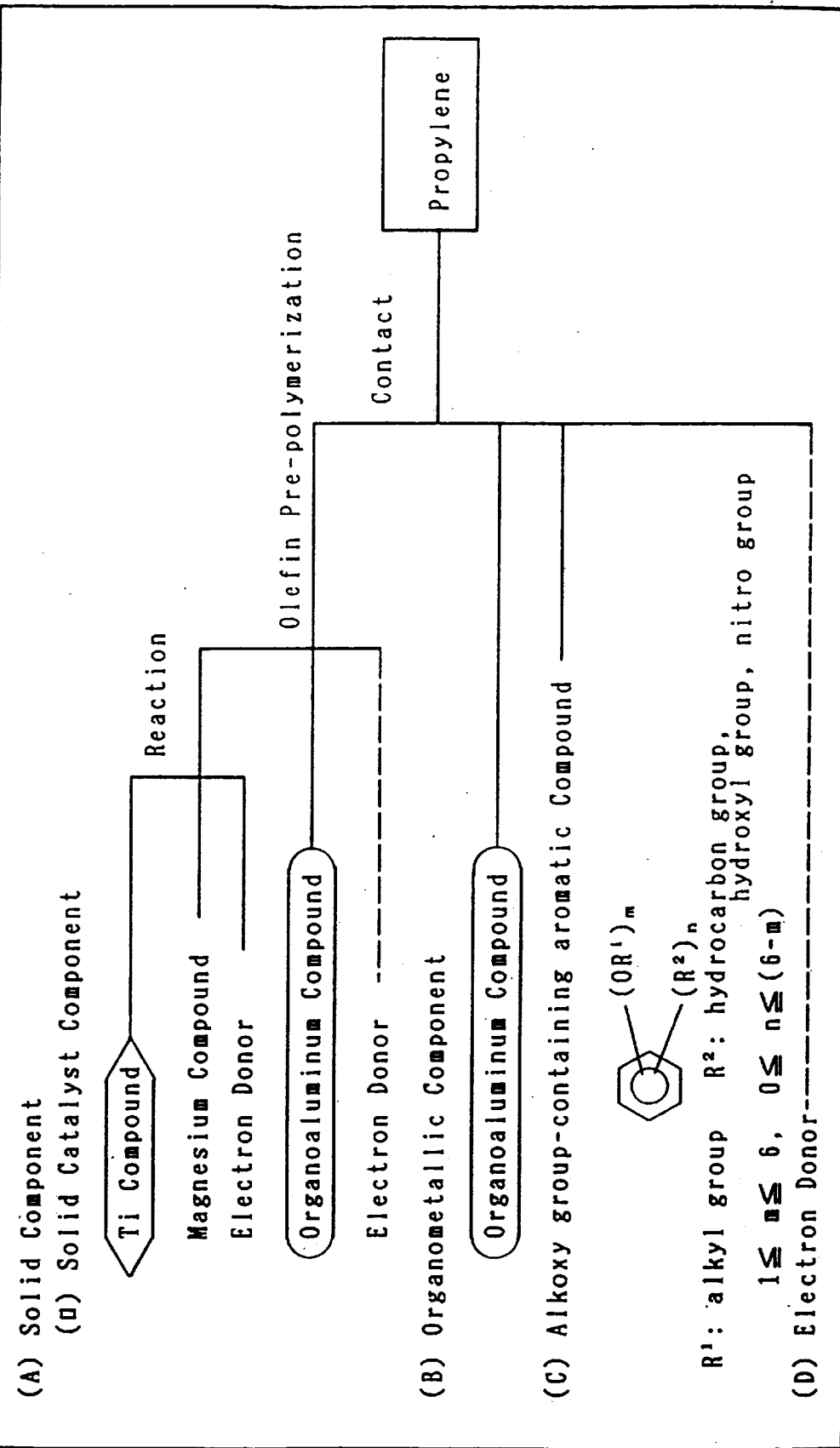
FIGS. 2 and 3 are flowcharts showing a different embodiment of a process for producing the flexible polypropylene resin of the present invention.

FIG. 2 is a flowchart showing one example of a process for production of the flexible polypropylene resin of the present invention, using a gas phase one-step method.

Gas Phase Multi-Step Polymerization Method

In a gas phase multi-step method, the catalyst according to the third embodiment of the present invention, and the like can be used.

In the gas phase multi-step method, the first polymerization (first step polymerization) is production of propylene homopolymers.

The second to final (n-step) polymerization is copolymerization of ethylene/propylene or copolymerization of ethylene/propylene/polyene.

Examples of the non-conjugated polyene which can be used herein to produce the copolymers, are those described in the above description of the third embodiment.

Further, suitable polymerization conditions and molecular weight control are as described in the description of the third embodiment.

Slurry One-Step Polymerization Method

In a slurry one-step method, for example, any one of the following catalysts (1) and (2) can be used.

(1) a catalyst system comprising (i) a solid catalyst component containing, as essential components, magnesium, titanium, a halogen atom and an electron donor, (ii) an alkoxy group-containing aromatic compound; and (iii) an organoaluminum compound.

(2) a catalyst system comprising (a) a solid compound prepared by reacting (i) the above solid catalyst component and (ii) an alkoxy group-containing aromatic compound in the presence or absence of (iii) an organoaluminum compound; and (b) an organoaluminum compound.

First, the catalyst system (1) will be described. The solid catalyst component (i) comprises, as essential components, magnesium, titanium, a halogen atom and an electron donor, and can be prepared by contacting a magnesium compound, a titanium compound and an electron donor.

In the preparation of the solid catalyst component (i), solvents can be used, which include a solvent inert to the magnesium compound, the electron donor and the titanium compound, such as aliphatic hydrocarbons such as hexane and heptane; aromatic hydrocarbons such as benzene and toluene; halogenated hydrocarbons such as mono- and poly-halogenated compounds of fatty, cyclic or aromatic hydrocarbons, which may be saturated or unsaturated, having 1 to 12 carbon atoms. These solvents can be used alone or in combination.

The magnesium compounds, titanium compounds and electron donative compounds for use in preparing the solid catalyst compound (i) of the catalyst system (1) can be the same as those described for the third embodiment of the present invention. The solid catalyst component (i) can be prepared from these compounds by any known methods such as a gas phase multi-step method.

The alkoxy group-containing aromatic compound (ii) and the organoaluminum compound (iii) to be contacted with the thus obtained solid catalyst component (i), can be the same as those described for the third embodiment of the present invention.

Each component of the catalyst system (1) is used in the following amounts. The solid catalyst component (i) may be used in an amount of from 0.0005 to 1 mmol per 1 liter of a reaction volume, in terms of titanium atom. The alkoxy group-containing aromatic compound (ii) may preferably be used in an amount to provide an aromatic compound/titanium molar ratio of 0.1 to 500, more preferably 1 to 300. The use of the molar ratio less than 0.01 will result in poor physical properties of the resultant polymers. The molar ratio more than 500 may result in poor catalytic activity. The organoaluminum compound (iii) may preferably be used in an amount to provide an Al/Ti atomic ratio of 1 to 3000, more preferably from 40 to 800. The use of the ranges outside of the atomic ratio will result in poor catalytic activity.

Next, the catalyst system (2) will be described. The solid component (a) of the catalyst system (2) can be prepared by reacting the solid component (i) of the above catalyst system (1) and the alkoxy group-containing aromatic compound (ii) in the presence or absence of the above-mentioned organoaluminum compound (iii). In the preparation, a hydrocarbon solvent (e.g., hydrocarbon solvents used to prepare the above catalyst system (1)), can usually be used.

The reaction temperature may usually range from 0 to 150° C., preferably 10 to 50° C. If the temperature is less than 0° C., the reaction cannot progress sufficiently. If the temperature is more than 150° C., a side reaction may occur, resulting in poor activity.

The reaction time may vary depending upon the reaction temperature, and may usually range from 1 minute to 20 hours, preferably from 10 to 60 minutes.

In the case of preparing the solid component (a) in the presence of the organoaluminum compound (III), the concentration of the aluminum compound (iii) may usually be from 0.05 to 100 mmol/l, preferably from 1 to 10 mmol/l. If the concentration is less than 0.05 mmol/l, the advantages of the organoaluminum compound (iii) cannot be sufficiently obtained. If the concentration is over 100 mmol/l, the reduction of titanium in the solid catalyst component will proceed, resulting in poor activity.

On the other hand, in the case of preparing the solid component by reacting the solid catalyst component (i) and the alkoxy group-containing aromatic compound (ii) in the absence of the organoaluminum compound (iii), the alkoxy group-containing compound (ii) is used in an amount to provide a ratio of the compound (ii) to the solid catalyst component (i) of generally 0.1 to 200, preferably 1 to 50. The concentration of the compound (ii) may usually range from 0.01 to 10 mmol/l, preferably 0.1 to 2 mmol/l. If the molar ratio in terms of titanium atom is outside of the above range, it is difficult to obtain a catalyst having a desired activity. If the concentration is less than 0.01 mmol/l, the resultant catalyst will have low volume efficiency and will not be suitable for practical use. If the concentration exceeds 10 mmol/l, an extra reaction9n is likely to occur, resulting in poor catalytic activity.

The organoaluminum compounds as described for the third embodiment of the present invention, can be also used for the organoaluminum compound (b) for the catalyst system (2).

Each component of the catalyst system (2) is used in the following amounts. The solid catalyst component (a) may be used in an amount of from 0.0005 to 1 mmol per 1 liter of a reaction volume, in terms of titanium atom. The organoaluminum compound (b) may preferably be used in an amount to provide an Al/Ti atomic ratio of 1 to 3000, more preferably from 40 to 800. The use of the ranges outside of the atomic ratio will result in poor catalytic activity.

If the flexible polypropylene polymers are produced using the thus obtained catalyst system (1) or (2), the reaction conditions may be described as follows. The reaction temperature may usually range from 0 to 200° C., more preferably 60 to 100° C. The reaction pressure may usually range from 1 to 50 Kg/cm$^2$·G. The reaction time may range from 5 minutes to 10 hours. In addition, molecular weight control can be made by a known method such as hydrogen gas concentration control.

Figure 3:
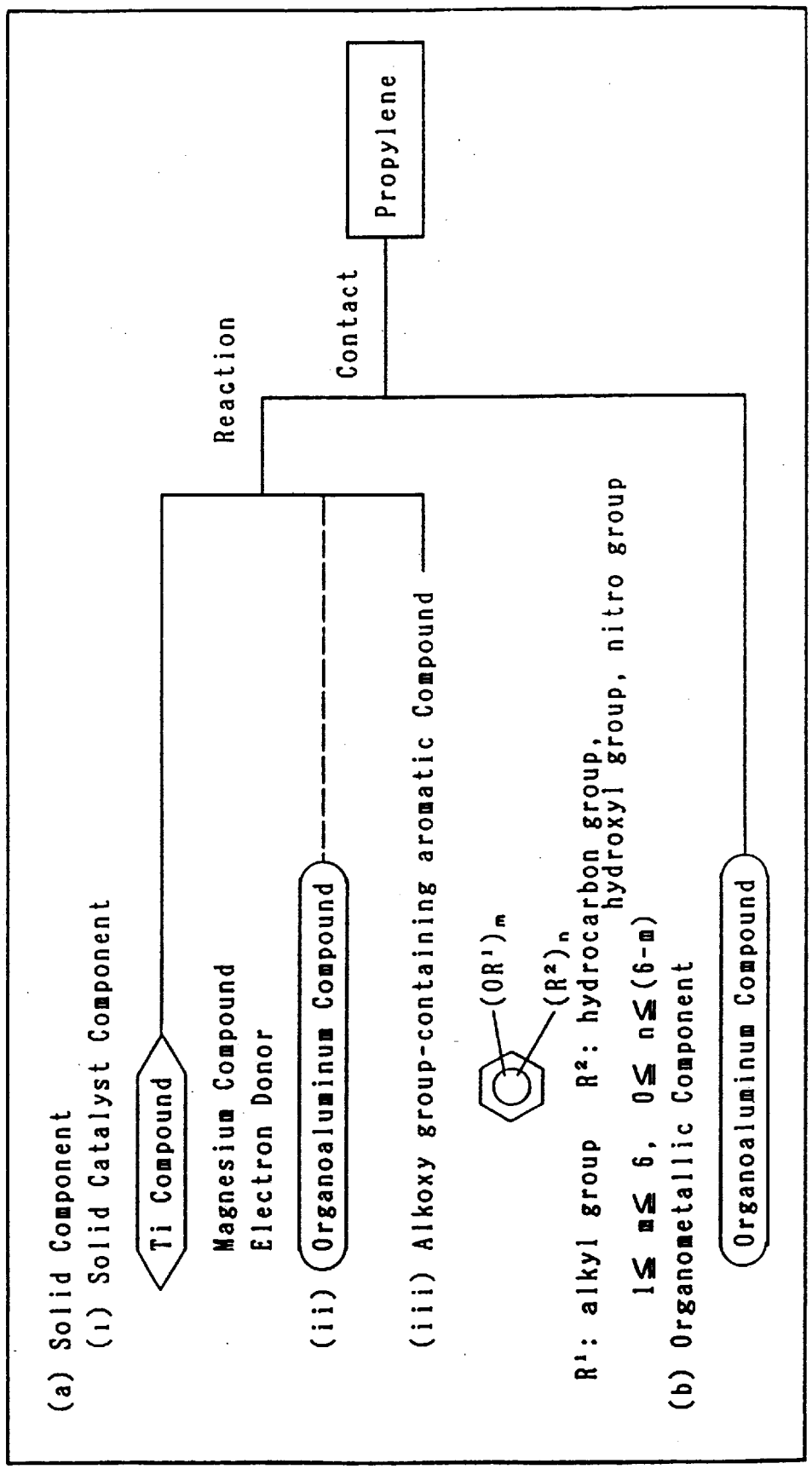

FIG. 3 is a flowchart showing one example of a process for production of the flexible polypropylene resin according to the first embodiment of the present invention, using a slurry one-step method. In addition, a production of the flexible polypropylene resin by a slurry one-step method can be also carried out by a method as shown in the flowchart of FIG. 1.

Slurry Multi-Step Polymerization Method

The same catalyst system used in the above-mentioned slurry one-step polymerization method can be used in this multi-step method.

In the slurry multi-step method, the order of polymerization and the number of polymerization steps are not particularly limited, and can be freely selected. For example, in the first and third steps of polymerization, homopolymerization of propylene can be carried out, and in the second or fourth steps, copolymerization of ethylene/propylene copolymers and ethylene/propylene/polyene copolymers can be carried out. The number of polymerization steps (n) can be selected as optimum number to obtain a desired product as is the same case with the above-mentioned gas phase multi-step method. The polymerization can be carried out continuously or batchwise.

In the case of production of propylene homopolymers, the polymerization temperature may usually range from 0 to 200° C., more preferably 60 to 100° C. The propylene pressure may usually range from 1 to 50 Kg/cm$^2$·G. In the case of production of an ethylene/propylene copolymer or an ethylene/propylene/polyene copolymer, the polymerization temperature may usually range from 0 to 200° C., preferably 40 to 80° C. The olefin pressure may usually range from 1 to 50 Kg/cm$^2$·G.

In the above polymerization, the reaction time may range from 5 minutes to 10 hours. In addition, molecular weight control can be made by a known method such as hydrogen gas concentration control.

In the case of production of an ethylene/propylene copolymer, the ethylene unit content can be controlled by controlling the ratio of components of the gas used. In the case of production of an ethylene/propylene/polyene copolymer, the polyene unit content can be controlled by controlling the amount of each component used. The polyene monomers as described for the third embodiment of the present invention can be also used herein.

Blending Method I

The flexible polypropylene resin (I) according to the first embodiment of the present invention, can be prepared by melt-blending, for example,the above component (X) and component (Y) in a prescribed amount, using a blender such as a kneader, a roll, Banbury mixer or an extruder with one roll bar or two roll bars.

Blending Method II

The elastomer composition according to the second embodiment of the present invention can be prepared by blending a propylene homopolymer (o) and and ethylene/propylene copolymer (p) or an ethylene/propylene/polyene copolymer (p') by a known method such as dry-blending or mixing. The propylene homopolymer (o) can be produced by the above-mentioned gas phase multi-step polymerization method or a slurry multi-step polymerization method. Further, the ethylene/propylene copolymer (p) and the ethylene/propylene/polyene copolymer (p') can be produced by a known method, respectively.

EXAMPLES

The present invention will be described in more detail with reference to the following examples, which are not intended to restrict the scope of the invention.

Preparation (1): Preparation of HSP-1 and HIP (1) Preparation of Solid Catalyst Component In a 500 ml three-necked glass flask sufficiently purged with nitrogen, were placed 20 ml of purified heptane, 4 g of Mg(OEt)$_2$ and 1.2 g of di-n-butyl phthalate. To the reaction mixture, 5 ml of TiCl$_4$ was added dropwise while the temperature of the reaction system was kept at 90° C. 110 ml of TiCl$_4$ was further added and then the reaction mixture was heated to 110° C. for 2 hours. Thereafter, the reaction product was washed with 100 ml of purified heptane. Then, 115 ml of TiCl$_4$ was added to the solid portion of the reaction product, and the reaction was further carried out at 110° C. for 2 hours. After completion of the reaction, the reaction product was washed with 100 ml of purified heptane several times to obtain a solid catalyst component.

(2) Polymerization of Propylene

In a 1 liter stainless autoclave, were placed 400 ml of n-heptane, 1.0 mmol of triethylaluminum (AlEt$_3$), 0.025 mmol of 1-allyl-3,4-dimethoxybenzene (ADMB) and 6 mg of the solid catalyst component obtained in the above procedures. Then, the polymerization was carried out under a propylene pressure of 8 Kg/cm$^2$·G at 70° C. for 2 hours. Then, 4 liter of n-heptane per 40 g of the resultant polymer was added to the resultant polymer, and the mixture was subjected to heat-refluxing while being stirred with a stirrer for 2 hours. Then, the reaction mixture was subjected to heat filtration, and atactic polypropylene, HSP-1 was recovered from the filtrate. The HSP-1 had a Mn of 37,000 and a Mw/Mn of 4.7.

On the other hand, the filter cake was recovered to obtain isotactic polypropylene, HIP. The HIP had a MI of 0.43 g/10 min.

Preparation (2): Preparation of HSP-2 to HSP-4

The same procedures as in Preparation (1) were repeated to prepare atactic polypropylene, HSP-2, HSP-3 and HSP-4 except that the amount of ADMB added was changed.

Preparation (3): Preparation of HSP-7

The same prodedures as in Preparation (1) were repeated except that the solid product prepared by drying the product resulting from the following reaction of metallic magnesium, ethanol and iodine was used instead of $Mg(OEt)_2$.

[Reaction of Metallic Magnesium, Ethanol and Iodine]

A glass reactor (inner Volume: 6 liter) equipped with a stirrer was purged with nitrogen gas. To the reactor, were introduced 160 g of metallic magnesium, about 2430 g of ethanol and 16 g of iodine. The reaction was carried out under heating and refluxing conditions while the reaction mixture was stirred until generation of hydrogen ended to obtain a reaction product.

The polymerization of propylene was carried out in the same manner as in Preparation (1) to prepare atactic polypropylene regarded as HSP-7.

Preparation (4): Preparation of HSP-8

The same procedures as in Preparation (2) were repeated except that the reaction product of metallic magnesium, ethanol and iodine was used without being dried, but filtered.

The polymerization of propylene was carried out in the same manner as in Preparation (2) to prepare atactic polypropylene as HSP-8.

Example 1

As antioxidant, 2000 wt. ppm of 2,6-di-t-butyl-p-cresol (BHT) was added to a mixture of 50 parts by weight of HSP-1 and 50 parts by weight of HIP, both prepared in the above Preparation. The obtained mixture was melt-blended by a laboplast mil having an inner volume of 30 ml at a revolution of 70 rpm at 195° C. for 2 minutes to obtain a flexible polypropylene resin. Thereafter, the physical properties of the pressed article of the blended material were measured. The results are as shown in Table 1.

Examples 2 to 4, 8, and 9, and Comparative Examples 3 and 4

The same procedures as in Example 1 were repeated except that the amount of HSP-1 or HIP used was changed. the results are as shown in Table 1.

Comparative Example 1

The same procedures as in Example 1 were repeated except that HSP-5 prepared using a catalyst system composed of $TiCl_4$/butylbenzoate/$MgCl_2$ and $AlEt_3$ was used instead of HSP-1. The resulta are as shown in Table 1.

Examples 5 to 7

The same procedures as in Example 1 were repeated except that HSP-2, HSP-3 or HSP4 was used instead of HSP-1. The results are as shown in Table 1.

Comparative Example 2

The same procedures as in Example 1 were repeated except that HSP-6 (prepared in the same manner as in the preparation of HSP-1 except that hydrogen was added during polymerization) was used instead of HSP-1. The results are as shown in Table 1.

Examples 10 and 11

The same procedures as in Example 1 were repeated except that HSP-7 or HSP-8 was used instead of HSP-1. The results are as shown in Table 1.

TABLE 1 (1)

| | Component Component (X) | | | | Component (Y) |
|---|---|---|---|---|---|
| | Kinds | M n | Mw/Mn | Amount (pbw.) | Amount (pbw.) |
| Example 1 | HSP-1 | 37,000 | 4.7 | 50 | 50 |
| Example 2 | HSP-1 | 37,000 | 4.7 | 60 | 40 |
| Example 3 | HSP-1 | 37,000 | 4.7 | 40 | 60 |
| Example 4 | HSP-1 | 37,000 | 4.7 | 75 | 25 |
| Comp. Ex. 1 | HSP-5 | 16,000 | 8.7 | 50 | 50 |
| Example 5 | HSP-2 | 32,000 | 5.3 | 50 | 50 |
| Example 6 | HSP-3 | 35,000 | 4.7 | 50 | 50 |
| Example 7 | HSP-4 | 41,000 | 4.5 | 50 | 50 |
| Comp. Ex. 2 | HSP-6 | 19,000 | 4.5 | 50 | 50 |
| Example 8 | HSP-1 | 37,000 | 4.7 | 25 | 75 |
| Example 9 | HSP-1 | 37,000 | 4.7 | 85 | 15 |
| Comp. Ex. 3 | HSP-1 | 37,000 | 4.7 | 6 | 94 |
| Comp. Ex. 4 | HSP-1 | 37,000 | 4.7 | 97 | 3 |
| Example 10 | HSP-7 | 37,000 | 4.7 | 50 | 50 |
| Example 11 | HSP-8 | 37,000 | 4.7 | 50 | 50 |

TABLE 1 (2)

| | Physical Properties | | | | |
|---|---|---|---|---|---|
| | TB (%) | MB (kg/cm$^2$) | MY (kg/cm$^2$) | MB/MY | PS100 (%) |
| Example 1 | 650 | 260 | 100 | 2.6 | 70 |
| Example 2 | 670 | 200 | 95 | 2.1 | 67 |
| Example 3 | 610 | 280 | 120 | 2.3 | 72 |
| Example 4 | 750 | 145 | 80 | 1.8 | 65 |
| Comp. Ex. 1 | 800 | 130 | 175 | 0.7 | 100 |
| Example 5 | 670 | 240 | 105 | 2.3 | 71 |
| Example 6 | 600 | 260 | 100 | 2.6 | 70 |
| Example 7 | 690 | 275 | 95 | 2.9 | 69 |
| Comp. Ex. 2 | 770 | 145 | 165 | 0.9 | 100 |
| Example 8 | 580 | 300 | 180 | 1.7 | 76 |
| Example 9 | 820 | 120 | 45 | 2.7 | 64 |
| Comp. Ex. 3 | 330 | 325 | 365 | 0.9 | 100 |
| Comp. Ex. 4 | 970 | 70 | — | — | 64 |
| Example 10 | 650 | 260 | 100 | 2.6 | 70 |
| Example 11 | 650 | 260 | 100 | 2.7 | 69 |

Note:
TB: Elongation at Break
MB: Fracture Stress
MY: Yield Stress
PS 100: Romaining Elongation After 100% Elongation

Example 12

(1) Preparation of Solid Catalyst Component (A-b)

In a 500 ml three-necked glass flask sufficiently purged with nitrogen, were placed 20 ml of purified heptane, 4 g of $Mg(OEt)_2$ and 1.2 g of di-n-butyl phthalate. To the reaction mixture, 4 ml of $TiCl_4$ was added dropwise while the temperature of the reaction system was kept at 90° C. 111 ml of $TiCl_4$ was further added and then the reaction mixture was heated to 110° C. for 2 hours. Thereafter, the reaction product was washed with 100 ml of purified heptane heated to 80° C.. Then, 115 ml of $TiCl_4$ was added to the solid portion of the reaction product, and the reaction was further carried out at 110° C. for 2 hours. After completion of the reaction, the reaction product was washed with 100 ml of purified heptane several times, to obtain a solid catalyst component.

(2) Preparation of Solid Component (A)

In a 2.5 liter three-necked, pressure glass flask sufficiently purged with nitrogen, were placed 1.7 liter of purified heptane, 0.07 mol of $AlEt_3$, 0.05 mmol of diphenyldimethoxysilane (DPDMS) and 120 g of the solid catalyst component obtained in the above Preparation (1). Then, the reaction system was kept at 30° C. and under an inner pressure of 0.5 $g/cm^2$.G by continuously adding propylene while the reaction mixture was stirred. The reaction was carried out for one hour. Then, the reaction product was purified 5 times with 1 liter of purified heptane to prepare a solid catalyst component (A).

(3) Gas Phase One-Step Polymerization

To a 5 liter stainless, pressure autoclave, were charged 20 g of polypropylene powders, 3 mmol of $AlEt_3$, 0.15 mmol of 1-allyl-3,4-dimethoxybenzene (ADMB), 0.23 mmol of diphenyldimethoxysilane (DPDMS) and 20 ml of heptane solution containing 100 mg of the solid catalyst component (A) (0.06 mmol: calculated in terms of Ti atom). After the reaction system was evacuated for 5 minutes, propylene gas was supplied until the total pressure of the reaction system reached 28 $Kg/cm^2$. Then, the gas phase polymerization was carried out at 70° C. for 17 hours to obtain 640 g of a flexible polypropylene resin having a MI of 0.27. The obtained resin had a HSP (boiling heptane soluble fraction) content of 35 wt. %; and a HIP (boiling heptane insoluble fraction) content of 65 wt. %. The HSP had an intrinsic viscosity of 1.95 dl/g and the HIP had an intrinsic viscosity of 4.78 dl/g.

Further, the obtained resin had a pentad fraction (rrrr/(1−mmmm)) measured by $^{13}$C-NMR, expressed as a percentage, of 34.5%; a melting peak temperature (Tm) measure by DSC of 158° C.; and an enthalpy of melting (ΔH) of 62.6 J/g. The domain structure was observed by a transmission type electron microscope. These results are as shown in Table 2.

Examples 13 to 15, and 18

The same procedures as in Example 12 were repeated to prepare a flexible polypropylene except that an ADMB/DPDMS ratio was changed to obtain a desired HSP/HIP ratio. The results are as shown in Table 2.

Example 16

In the same manner as in Example 12, a solid catalyst component was prepared and then a solid component (A) was prepared.

In a 5 liter three-necked, pressure glass flask sufficiently purged with nitrogen, were charged 20 g of polypropylene powders, 3 mmol of $AlEt_3$, 0.15 mmol of 1-allyl-3,4-dimethoxybenzene (ADMB), and 20 ml of heptane solution containing 100 mg of the solid catalyst component (A) (0.06 mmol: calculated in terms of Ti atom). After the reaction system was evacuated for 5 minutes, propylene gas was supplied until the total pressure of the reaction system reached 20 $Kg/cm^2$. The gas phase polymerization was carried out at 50° C. for 17 hours, to obtain 350 g of a flexible polypropylene resin having a MI of 0.10. The obtained resin had a HSP (boiling heptane soluble fraction) content of 41 wt. %; and a HIP (boiling heptane insoluble fraction) content of 59 wt. %. The HSP had an intrinsic viscosity of 2.98 dl/g and the HIP had an intrinsic viscosity of 6.14 dl/g.

Further, the obtained resin had a pentad fraction (rrrr/1−mmmm) measured by $^{13}$C-NMR of 29.8%; a melting peak temperature (Tm) measure by DSC of 158° C.; and an enthalpy of melting (ΔH) of 54.1 J/g. The domain structure was observed by a transmission type electron microscope. These results are as shown in Table 2.

Example 17

The same procedures as in Example 12 were repeated to prepare a flexible polypropylene resin except that the amount of cocatalyst for polymerization and the like were changed to obtain a flexible polypropylene resin containing a HSP with a desired intrinsic viscosity. The results are as shown in Table 2.

Comparative Examples 5 to 7

The same procedures as in Example 12 were repeated to prepare a flexible polypropylene resin except that the amount of cocatalyst for polymerization was changed to obtain a flexible polypropylene containing a HSP and a HIP at a specific ratio, the HSP having a desired intrinsic viscosity. The results are as shown in Table 2.

Examples 19

The same procedures as in Example 12 were repeated except that the solid product prepared by drying the product resulting from the following reaction of metallic magnesium, ethanol and iodine was used instead of $Mg(OEt)_2$.

[Reaction of Metallic Magnesium, Ethanol and Iodine]

A glass reactor (inner Volume: 6 liter) equipped with a stirrer was purged with nitrogen gas. To the reactor, were introduced 160 g of metallic magnesium, about 2430 g of ethanol and 16 g of iodine. The reaction was carried out under heating and refluxing conditions while the reaction mixture was stirred until generation of hydrogen ended to obtain a reaction product. The results are as shown in Table 2.

Example 20

The same procedures as in Example 19 were repeated except that the reaction product of metallic magnesium, ethanol and iodine was used without being dried, but filtered. The results are as shown in Table 2.

In addition, each physical property of the polymer was measured as follows.

Intrinsic Viscosity [η]

The intrinsic viscosity was measured in a decaline solution at 135° C.

Tm and ΔH

The melting peak temperature (Tm: temperature at melting peak) was measured by a differential thermal analysis measurement equipment (DSC-7: manufactured by Perkin-Elmer) in accordance with JIS-K7121. Further, the enthalpy of melting (ΔH: total amount of energy absorbed at time of melting of crystalline) was measured in accordance with JIS-K7122.

Domain Structure

A specimen was prepared by a $RuO_4$ dyeing method and ultra-thin plate method. The domain structure was observed by a transmission type electron microscope (JEM-100CKII: Manufactured by Nihon Denshi Co., Ltd.) at an acceleration voltage of 100 KV with a magnification of 1000 to 60000.

rrrr/(1−mmmm)

JNM-FX-200 (Manufactured by Nihon Denshi Co., Ltd: $^{13}$C-nuclear resonance frequency of 50.1 MHz) was used as measurement equipment. The measurement conditions were as follows.

Measurement Mode: Proton Complete Decoupling Method

Pulses Width: 6.9 microseconds

Pulse Repeating Time: 3 seconds

Integrating Times: 10000

Solvent: 1,2,4-trichlorobenzene/heavy benzene (90/10 Vol. %)

Concentration of Sample: 250 mg/2.5 ml Solvent

Measurement Temperature: 130° C.

Under the above measurement conditions, the pentad fraction is measured using a difference in chemical shift due to a stereoregularity of a methyl group. More specifically, the pentad fraction is calculated from an area strength ratio of each peak of mmmm to mrrm appearing in a region of 22.5 to 19.5 ppm. In addition, the chemical shift of each atmospheric methyl group, when tetramethylsilane (TMS) is used as standard substance, is as follows.

mmmm—21.86 ppm mmmr—21.62 ppm mmrr—21.08 ppm mmrm+rrmr—20.89 ppm rrrr—20.36 ppm mrrm—19.97 ppm Melt Flow Rate (MI) Measurement The melt flow rate was measured at 230° C. at a testing load of 2.16 Kgf in accordance with JIS-K7210.

Tensile Test

As a specimen, JIS 2 type dunbel (thickness of 1 mm; pressed article) was used, and the tensil strength was measured at a testing speed of 50 mm/min. at 23° C. in accordance with JIS-K7113.

Izod Impact Strength Test

As a specimen, JIS 2 type A-punched plate (thickness of 3 mm; pressed articel) was used, and the impact strength was measured under the conditions as indicated in the table in accordance with JIS-K7110.

TABLE 2 (1)

| | Polymer Formulation | | | | Polymer Properties | | |
|---|---|---|---|---|---|---|---|
| | (x)HSP Portion | | (y)HIP Portion | | rrrr/ | | |
| | [η] (dl/g) | Amount (wt/%) | [η] (dl/g) | Amount (wt/%) | (1−mmmm) (%) | Tm (° C.) | ΔH (J/g) |
| Example 12 | 1.95 | 35 | 4.78 | 65 | 34.5 | 158 | 62.6 |
| Example 13 | 1.67 | 80 | 3.79 | 20 | 46.9 | 156 | 30.2 |
| Example 14 | 1.70 | 56 | 4.37 | 44 | 40.2 | 155 | 33.9 |

TABLE 2 (1)-continued

| | Polymer Formulation | | | | Polymer Properties | | |
|---|---|---|---|---|---|---|---|
| | (x)HSP Portion | | (y)HIP Portion | | rrrr/ | | |
| | [η] (dl/g) | Amount (wt/%) | [η] (dl/g) | Amount (wt/%) | (1−mmmm) (%) | Tm (° C.) | ΔH (J/g) |
| Example 15 | 1.77 | 25 | 4.82 | 75 | 32.1 | 161 | 80.2 |
| Example 16 | 2.98 | 41 | 6.14 | 59 | 29.8 | 158 | 53.3 |
| Example 17 | 1.66 | 51 | 4.33 | 49 | 33.3 | 158 | 54.1 |
| Comp. Ex. 5 | 0.63 | 5 | 4.42 | 95 | 2.3 | 165 | 110 |
| Comp. Ex. 6 | 0.82 | 56 | 3.83 | 44 | 9.8 | 154 | 65.8 |
| Example 18 | 1.63 | 15 | 4.71 | 85 | 30.5 | 166 | 95.2 |
| Comp. Ex. 7 | 1.77 | 95 | 4.01 | 5 | 40.3 | 150 | 35.2 |
| Example 19 | 1.95 | 35 | 4.78 | 65 | 34.5 | 158 | 62.6 |
| Example 20 | 1.95 | 35 | 4.78 | 65 | 34.6 | 158 | 62.7 |

Note:
1) unit: kg · cm/cm

TABLE 2 (2)

| | Physical Properties | | | | |
|---|---|---|---|---|---|
| | M I (g/10 min) | Izod 23° C. | Impact Strength −20° C. | Tensile Strength (kg/cm$^2$) | Heat Distortion Temp (° C.) | Domain Structure Yes: ○ No: X |
| Example 12 | 0.27 | N B | 3.2 | 5500 | 60.4 | ○ |
| Example 13 | 0.41 | N B | 4.5 | 1000 | 55.0 | ○ |
| Example 14 | 0.45 | N B | 3.5 | 2800 | 60.1 | ○ |
| Example 15 | 0.03 | N B | 2.6 | 7000 | 65.1 | ○ |
| Example 16 | 0.10 | N B | 4.0 | 4500 | 60.0 | ○ |
| Example 17 | 0.79 | N B | 3.2 | 3200 | 60.3 | ○ |
| Comp. Ex. 5 | 0.12 | 1.8 | 1.4 | 16500 | 110 | X |
| Comp. Ex. 6 | 0.35 | 8.5 | 1.6 | 2800 | 50.2 | X |
| Example 18 | 0.10 | N B | 2.8 | 8500 | 66.2 | ○ |
| Comp.Ex. 7 | 0.63 | N B | 7.1 | 1000 | 35.0 | X |
| Example 19 | 0.27 | N B | 3.2 | 5500 | 60.4 | ○ |
| Example 20 | 0.27 | N B | 3.2 | 5500 | 60.4 | ○ |

Example 21

(1) Preparation of Solid Catalyst Component (A-b)

In a 500 ml three-necked glass flask sufficiently purged with nitrogen, were placed 20 ml of purified heptane, 4 g of $Mg(OEt)_2$ and 1.2 g of di-n-butyl phthalate. To the reaction mixture, 4 ml of $TiCl_4$ was added dropwise while the temperature of the reaction system was kept at 90° C. 111 ml of $TiCl_4$ was further added and then the reaction mixture was heated to 110° C. Then, the reaction was carried out at 110° C. for 2 hours. Thereafter, the reaction product was washed with purified heptane heated to 80° C. Then, 115 ml of $TiCl_4$ was added to the solid portion of the reaction product, and the reaction was further carried out at 110° C. for 2 hours. After completion of the reaction, the reaction product was washed with 100 ml of purified heptane several times, to obtain a solid catalyst component.

(2) Preparation of Solid Component (A)

In a 2.5 liter three-necked, pressure glass flask sufficiently purged with nitrogen, were placed 1.7 liter of purified heptane, 0.07 mol of AlEt$_3$, 0.05 mmol of diphenyldimethoxysilane (DPDMS) and 12.0 g of the solid catalyst component obtained in the above Preparation (1). Then, the reaction system was kept at 30° C. and under an inner pressure of 0.5 g/cm$^2$.G by continuously adding propylene while the reaction mixture was stirred. The reaction was carried out for one hour. Then, the reaction product was purified 5 times with 1 liter of purified heptane to prepare a solid catalyst component (A).

(3) Gas Phase One-Step Polymerization

In a 5 liter stainless, pressure autoclave, were placed 20 g of polypropylene powders, 3 mmol of AlEt$_3$, 0.15 mmol of 1-allyl-3,4-dimethoxybenzene (ADMB), 0.23 mmol of diphenyldimethoxysilane (DPDMS) and 20 ml of heptane solution containing 100 mg of the solid catalyst component (A) (0.06 mmol: calculated in terms of Ti atom). After the reaction system was evacuated for 5 minutes, propylene gas was supplied until the total pressure of the reaction system reached 28 Kg/cm$^2$. Then, the gas phase polymerization was carried out at 70° C. for 1.7 hours.

(4) Gas Phase Two-Step Polymerization

After completion of the reaction in the above (3), the reaction system was depressurized and evacuated. Then, a mixed gas of ethylene and propylene (mol ratio of ¼) was added to the reaction system until the pressure reached 10 Kg/cm$^2$. Thereafter the gas phase polymerization was carried out at 50° C. for 1.4 hours, to obtain 550 g of a propylene based elastomer having a Melt Index (MI) of 0.1 g/10 min. The obtained elastomer was composed of 65 wt. % of a polypropylene homopolymer and 35 wt. % of an ethylene/propylene copolymer. The homopolymer contained 35 wt. % of HSP (boiling heptane soluble fraction) having an intrinsic viscosity of 1.95 dl/g and 65 wt. % of HIP (boiling heptane insoluble fraction) having an intrinsic viscosity of 4.78 dl/g. The obtained elastomer had a pentad fraction (rrrr/(1−mmmm)) measured by $^{13}$C-NMR, expressed as a percentage, of 34.5%; a melting peak temperature (Tm) measured by DSC of 158° C.; and an enthalpy of melting (ΔH) of 62.6 J/g. The domain structure was observed by a transmission type electron microscope. On the other hand, the copolymer had an ethylene unit content of 31 mol % and an intrinsic viscosity of 4.81 dl/g.

Examples 22 to 24, 32 and 33 and Comparative Examples 8 and 10

The same procedures as in Example 21 were repeated except that the ratio of ADMB/DPDMS was changed to obtain a resin having specific HSP content.

Examples 25 to 27 and Comparative Example 9

The same procedures as in Example 21 were repeated except that the hydrogen concentration was changed to obtain a resin having a HSP with prescribed intrinsic viscosity.

Examples 28, 29, 34 and 35 and Comparative Example 11

The same procedures as in Example 21 were repeated except that the polymerization time for the second polymerization step was changed to obtain a resin having a prescribed ratio of component (o) and component (p) or (p').

Example 30

Blending Method

The propylene homopolymer synthesized in Example 21 and a EP rubber were melt-blended.

(1) Propylene Homopolymerization by Gas Phase Method

In a 5 liter stainless, pressure autoclave, were placed 20 g of polypropylene powders, 3 mmol of AlEt$_3$, 0.15 mmol of 1-allyl-3,4-dimethoxybenzene (ADMB), 0.23 mmol of diphenyldimethoxysilane (DPDMS) and 20 ml of heptane solution containing 100 mg of the solid catalyst component (A) (prepared in Example 21 (2); 0.06 mmol as calculated in terms of Ti atom). After the reaction system was evacuated for 5 minutes, propylene gas was supplied until the total pressure of the reaction system reached 28 Kg/cm$^2$. Then, the gas phase polymerization was carried out at 70° C. for 1.7 hours.

(2) Melt-Blending of Propylene Homopolymer and EP Rubber

In a laboplast mil having an inner volume of 30 ml, 13 g of propylene homopolymer obtained in Preparation (1) and 7 g of an ethylene/propylene copolymer rubber (Manufactured by Nippon Synthetic Rubber; Tradename EP02P) at a rotation of 70 rpm at 195° C. for 2 hours, to obtain 20 g of an elastomer having a Melt Index of 0.5 g/10 min. The obtained elastomer was composed of 65 wt. % of a polypropylene homopolymer and 35 wt. % of an ethylene/propylene copolymer. The homopolymer contained 35 wt. % of HSP (boiling heptane soluble fraction) having an intrinsic viscosity of 1.95 dl/g and 65 wt. % of HIP (boiling heptane insoluble fraction) having an intrinsic viscosity of 4.78 dl/g. The ethylene/propylene copolymer had an ethylene unit content of 73.1 mol % and an intrinsic viscosity of 1.37 dl/g. The results of evaluation of the pressed article of the obtained blend are as shown in Table 3.

Example 31

The same procedures as in Example 30 were repeated except that an ethylene/propylene rubber (Nihon Synthetic Rubber Co., Ltd.: Tradename EP07P) having an ethylene unit content of 71.3 mol % and an intrinsic viscosity of 1.97 dl/g was used as the ethylene propylene rubber.

Example 36

(1) Gas Phase One-Step Polymerization

In a 5 liter stainless, pressure autoclave, were placed 20 g of polypropylene powders, 2 mmol of AlEt$_3$, 0.5 mmol of diphenyldimethoxysilane (DPDMS) and 20 ml of heptane solution containing 17 mg of the solid catalyst component (A) of Example 17 (0.06 mmol as calculated in terms of Ti atom). After the reaction system was evacuated for 5 minutes, propylene gas was supplied until the total pressure of the reaction system reached 31 Kg/cm$^2$. Then, the gas phase polymerization was carried out at 70° C. for 1.7 hours.

(2) Gas Phase Two-Step Polymerization

After completion of the reaction in the above (1), the reaction system was depressurized and evacuated. Then, nitrogen gas was introduced thereto until inner pressure reached normal pressure. Thereafter, 3.8 ml (30 mmol) of dicyclopentadiene was added and the reaction system was evacuated. Then, a mixed gas of ethylene and propylene (mol ration of 2/3) was added to the reaction system until the pressure reached 10 Kg/cm$^2$. Then, the gas phase polymerization was carried out at 50° C. fro 1.4 hours, to obtain 540 g of a flexible polypropylene having a Melt Index (MI) of 0.1 g/10 min. The obtained polypropylene was composed of 65 wt. % of a polypropylene homopolymer and 35 wt. % of an ethylene/propylene copolymer. The homopolymer contained 35 wt. % of HSP (boiling heptane soluble fraction) having an intrinsic viscosity of 1.95 dl/g and 65 wt. % of HIP (boiling heptane insoluble fraction) having an intrinsic viscosity of 4.78 dl/g. The polypropylene had a pentad fraction (rrrr/(1-mmmm)), measured by $^{13}$C-NMR, expressed as a percentage, of 34.5%; a melting peak temperature (Tm) measured by DSC of 158° C.; and an enthalpy of melting ($\Delta$H) of 62.6 J/g. The domain structure was observed by a transmission type electron microscope. On the other hand, the copolymer had an ethylene unit content of 31 mol %; a polyene unit content of 35 wt. %; and an intrinsic viscosity of 4.79 dl/g.

Example 37

The same procedures as in Example 21 were repeated except that the solid product prepared by drying the product resulting from the following reaction of metallic magnesium, ethanol and iodine was used instead of Mg(OEt)$_2$.

[Reaction of Metallic Magnesium, Ethanol and Iodine]

A glass reactor (inner Volume: 6 liter) equipped with a stirrer was purged with nitrogen gas. To the reactor, were introduced 160 g of metallic magnesium, about 2430 g of ethanol and 16 g of iodine. The reaction was carried out under heating and refluxing conditions while the reaction mixture was stirred until generation of hydrogen ended to obtain a reaction product.

Example 38

The same procedures as in Example 37 were repeated except that the reaction product of metallic magnesium, ethanol and iodine was used without being dried, but filtered.

The results of the above examples and comparative examples are as shown in Table 3. The following test was conducted in addition to the evaluation as described above.

Shore Hardness D (Durometer D Hardness)

As a specimen, a 3 mm thick plate (pressed article) was used, and the hardness was measured at 23° C. in accordance with JIS-K7215.

TABLE 3 (1)

| | Propylene Based Elastomer Composition (o + p) | | | | | | | | |
|---|---|---|---|---|---|---|---|---|---|
| | Polypropylene (o) | | | | | | | | |
| | HSP Portion | | Property | | | | HIP Portion | | |
| | Amount (wt %) | Intrinsic Viscosity (g/dl) | rrrr/ (l-mmmm) (%) | Tm (C.°) | $\Delta$H (J/g) | Structure Yes: ○ No: X | Amount (wt %) | Intrinsic Viscosity (g/dl) | Amount (wt %) |
| Example 21 | 35 | 1.95 | 34.5 | 158 | 62.6 | ○ | 65 | 4.78 | 65 |
| Example 22 | 45 | 2.01 | 37.3 | 157 | 45.2 | ○ | 55 | 4.13 | 60 |
| Example 23 | 50 | 1.98 | 38.6 | 157 | 35.5 | ○ | 50 | 4.45 | 63 |
| Example 24 | 65 | 2.03 | 42.5 | 155 | 31.5 | ○ | 35 | 4.15 | 65 |
| Comp. Ex. 8 | 5 | 1.9 | 2.3 | 165 | 110 | X | 95 | 3.00 | 65 |
| Example 25 | 35 | 2.98 | 34.5 | 158 | 58 | ○ | 65 | 6.14 | 70 |
| Example 26 | 40 | 2.41 | 35.6 | 158 | 60.3 | ○ | 60 | 5.42 | 65 |
| Example 27 | 36 | 2.25 | 34.5 | 158 | 61.5 | ○ | 64 | 4.37 | 67 |
| Comp. Ex. 9 | 35 | 1.09 | 9.8 | 154 | 65.8 | X | 65 | 1.64 | 65 |
| Example 28 | 35 | 1.99 | 34.4 | 158 | 62.5 | ○ | 65 | 4.13 | 75 |
| Example 29 | 35 | 1.95 | 34.5 | 158 | 62.6 | ○ | 65 | 4.78 | 45 |
| Example 30 | 35 | 1.95 | 34.5 | 158 | 62.6 | ○ | 65 | 4.78 | 65 |
| Example 31 | 35 | 1.95 | 34.5 | 158 | 62.6 | ○ | 65 | 4.78 | 65 |
| Example 32 | 15 | 1.53 | 25.2 | 156 | 85.2 | ○ | 85 | 4.33 | 65 |
| Example 33 | 85 | 2.25 | 46.9 | 156 | 30.2 | ○ | 15 | 4.37 | 63 |
| Comp. Ex. 10 | 92 | 1.3 | 9.8 | 150 | 25.4 | X | 8 | 1.95 | 61 |
| Example 34 | 35 | 1.95 | 34.5 | 168 | 62.6 | ○ | 65 | 4.78 | 15 |
| Example 35 | 38 | 1.97 | 34.5 | 158 | 62.4 | ○ | 62 | 4.78 | 85 |
| Comp. Ex. 11 | 36 | 1.98 | 34.5 | 158 | 62.4 | ○ | 64 | 4.78 | 97 |
| Example 36 | 35 | 1.95 | 34.5 | 158 | 62.6 | ○ | 65 | 4.78 | 65 |
| Example 37 | 35 | 1.95 | 34.5 | 158 | 62.6 | ○ | 65 | 4.78 | 65 |
| Example 38 | 35 | 1.95 | 34.5 | 158 | 62.6 | ○ | 65 | 4.78 | 65 |

TABLE 3 (2)

| | Copolymer Formulation Components (P) or (P') | | | | | Physical Properties | | | | |
|---|---|---|---|---|---|---|---|---|---|---|
| | Ethylene Content (wt %) | intrinsic Viscosity (g/dl) | Amount (wt %) | MI (g/10 min) | Shore Hardness (D Scale) | Yield Stress (kg/cm²) | Fracture Stress (kg/cm²) | Elongation at Break (%) | Tensile Elasticity (kg/cm²) | Izod impact Strength /20° C. (kg/cm/cm) |
| Example 21 | 31 | 4.81 | 35 | 0.1 | 55 | — | 200 | 500 | 2500 | N B |
| Example 22 | 30 | 4.77 | 40 | 0.1 | 54 | — | 150 | 510 | 2000 | N B |
| Example 23 | 30 | 4.8 | 37 | 0.1 | 50 | — | 120 | 480 | 1810 | N B |
| Example 24 | 31 | 4.75 | 35 | 0.1 | 50 | — | 100 | 500 | 1600 | N B |
| Comp. Ex. 8 | 30 | 4.88 | 35 | 0.1 | 90 | 220 | 80 | 120 | 11000 | 5.2 |
| Example 25 | 35 | 4.8 | 30 | 0.05 | 58 | — | 200 | 230 | 2500 | N B |
| Example 26 | 30 | 4.79 | 35 | 0.08 | 55 | — | 180 | 500 | 2300 | N B |
| Example 27 | 32 | 4.74 | 33 | 0.1 | 57 | — | 200 | 510 | 2000 | N B |
| Comp. Ex. 9 | 31 | 4.52 | 35 | 0.5 | 60 | 150 | 50 | 210 | 5000 | 5.0 |
| Example 28 | 30 | 4.7 | 25 | 0.1 | 53 | — | 250 | 520 | 3000 | N B |
| Example 29 | 29 | 4.8 | 55 | 0.1 | 50 | — | 100 | 480 | 1500 | N B |
| Example 30 | 73.1 | 1.37 | 35 | 0.5 | 55 | — | 170 | 450 | 2500 | N B |
| Example 31 | 71.3 | 1.97 | 35 | 0.3 | 55 | — | 190 | 500 | 2300 | N B |
| Example 32 | 30 | 4.87 | 35 | 0.2 | 58 | 80 | 260 | 310 | 7500 | 19.2 |
| Example 33 | 31 | 4.66 | 37 | 0.1 | 50 | — | 100 | 540 | 1200 | N B |
| Comp. Ex. 10 | 30 | 4.6 | 39 | 0.2 | 40 | — | 80 | 500 | 8000 | N B |
| Example 34 | 30 | 4.5 | 85 | 0.1 | 48 | — | 150 | 550 | 1000 | N B |
| Example 35 | 33 | 4.61 | 15 | 0.1 | 59 | — | 260 | 500 | 5300 | 20.1 |
| Comp. Ex. 11 | 30 | 4.5 | 3 | 0.2 | 65 | 150 | 360 | 540 | 5500 | 2.1 |
| Example 36 | 31 | 4.79 | 35 | 0.1 | 54 | — | 190 | 510 | 2400 | N B |
| Example 37 | 31 | 4.81 | 35 | 0.1 | 55 | — | 200 | 500 | 2500 | N B |
| Example 38 | 31 | 4.81 | 35 | 0.1 | 55 | — | 200 | 500 | 2500 | N B |

Example 39

(1) Preparation of Solid Catalyst Component (A-b)

In the same manner as in Example 21, a solid catalyst component (A-b) was prepared.

(2) Preparation of Solid Component (A)

In the same manner as in Example 21 (2), a solid component (A) was prepared.

(3) Gas Phase One-Step Polymerization

In the same manner as in Example 21 (3), the gas phase one-step polymerization was conducted.

The working conditions are as shown in Table 4.

As a result of the above polymerization, 370 g of polypropylene homopolymer having a Melt Index (MI) of 0.07 g/10 min. was obtained. The obtained polymer had a HSP (boiling heptane-soluble fraction) content of 35.1 wt. %; an intrinsic viscosity of 1.95 dl/g; and a bulk density of 0.33 g/dl. The powder properties of the obtained product were also excellent. The results are as shown in Table 4.

Examples 40 to 42

The same procedures as in Example 39 were repeated except that the amount of 1-allyl-3,4-dimethoxybenzene (ADMB), Component (C) of the catalyst system and the amount of dimethoxydiphenylsilane (DMDPS), Component (D) were changed.

Examples 43 to 45

The same procedures as in Example 39 were repeated except that the kinds of Components (C) and (D) of the catalyst system were changed.

Examples 46 and 47

The same procedures as in Example 39 were repeated except that hydrogen was added during the polymerization.

Examples 48 and 49

The same procedures as in Example 39 were repeated except that the reaction temperature was changed.

Examples 50 to 52

The same procedures as in Example 39 were repeated except that the amount and/or kinds of the component (A) of the catalyst system was changed.

Example 53

The same procedures as in Example 39 were repeated except that a solid component (A) was prepared in the following manner.

Into a 0.5 liter stainless, pressure autoclave, were introduced 0.4 liter of purified heptane, 90 g of polypropylene powders, 0.01 mol of AlEt$_3$, 0.005 mol of diphenyldimethoxysilane (DPDMS) and 30 g of the solid catalyst component (A-b) while the mixture was stirred. After stirring the mixture for 15 minutes, a supernatant was removed. Then, the resultant product was vacuum dried to obtain a solid component (A).

Comparative Example 12

The same procedures as in Example 39 were repeated except that the component (D) (DMDPS) of the catalyst system was not added.

Comparative Example 13

The same procedures as in Example 39 were repeated except that the component (C) (ADMB) of the catalyst system was not added.

The working conditions and the results of Examples 39 to 53 and Comparative Examples 12 and 13 are as shown in Table 4.

Example 54

(1) Preparation of Solid Catalyst Component (A-b)

In the same manner as in Example 21, a solid catalyst component (A-b) was prepared.

(2) Preparation of Solid Component (A)

In the same manner as in Example 21 (2), a solid component (A) was prepared.

(3) Gas Phase One-Step Polymerization

In the same manner as in Example 21 (3), the gas phase one-step polymerization was conducted.

(4) Gas Phase Two-Step Polymerization

After completion of the reaction in the above (3), the reaction system was depressurized and evacuated. Then, a mixed gas of ethylene and propylene (mol ratio of 1/4) was added to the reaction system until the pressure reached 11 Kg/cm$^2$. Then, the gas phase polymerization was carried out at 50° C. fro 1.4 hours.

The working conditions are as shown in Table 5.

There was obtained 810 g of an ethylene/propylene block copolymer having a Melt Index (MI) of 0.1 g/10 min. The obtained copolymer was composed of 65 wt. % of a polypropylene homopolymer having an intrinsic viscosity of 3.86 dl/g; and 35 wt. % of an ethylene/propylene block copolymer having an intrinsic viscosity of 4.81 dl/g. The results are as shown in Table 6.

Examples 55 to 57

The same procedures as in Example 54 were repeated except that the polymerization time for the second polymerization step was changed. The results are as shown in Table 3.

Examples 58 and 59

The same procedures as in Example 54 were repeated except that the ratio of the gas components was changed.

Examples 60 to 62

The same procedures as in Example 54 were repeated except that hydrogen was added during the polymerization.

Comparative Example 14

The same procedures as in Example 54 were repeated except that the component (C) (ADMB) for the catalyst system was not added.

The working conditions and the results of Examples 54 to 62 and Comparative Example 14 are as shown in Table 5 and Table 6, respectively.

The polymer compositions obtained in Examples 54 to 62 and Comparative Example 14 were evaluated in physical properties such as Melt Index, Shore hardness, yield stress, fracture stress, elongation at break, tensile elastic modulus and izod impact strength value. The results of measurements are as shown in Table 6. In addition, each measurement was conducted in the same manner as above.

TABLE 4 (1)

| | Catalyst Components | | | | | | |
|---|---|---|---|---|---|---|---|
| | Component (A) | | Component C* 2 | | Component D *2 | | Ti atom in |
| | (A-a) Kind | (A-a)/ (A-b) (wt/wt) | Kind | Amount (mmol) | Kind | Amount (mmol) | (C)/(A) (mmol/ mmol) | (C)/(D) (mmol/ mmol) |
| Example 39 | Polypropylene | 3.2 | ADMB | 0.150 | DMDPS | 0.230 | 7.6 | 0.65 |
| Example 40 | " | " | " | 0.150 | " | 0.115 | " | 1.30 |
| Example 41 | " | " | " | 0.150 | " | 0.300 | " | 0.50 |
| Example 42 | " | " | " | 0.150 | " | 0.45. | 8.6 | 0.38 |
| Example 43 | " | " | " | 0.150 | PTES | 0.230 | 7.6 | 0.65 |
| Example 44 | " | " | " | 0.150 | TMPi | 0.230 | " | 0.65 |
| Example 45 | " | " | DMB | 0.150 | DMDPS | 0.230 | " | 0.65 |
| Comp. Ex. 12 | " | " | ADMB | 0.150 | — | — | — | — |
| Comp. Ex. 13 | " | " | — | — | DMDPS | 0.230 | — | — |
| Example 46 | " | " | ADMB | 0.150 | DMDPS | 0.230 | 7.6 | 0.65 |
| Example 47 | " | " | " | 0.150 | " | " | " | " |
| Example 48 | " | " | " | 0.150 | " | 0.230 | " | " |
| Example 49 | " | " | " | 0.150 | " | " | " | " |
| Example 50 | " | 5.0 | " | 0.150 | " | 0.230 | " | " |
| Example 51 | " | 1.6 | " | " | " | " | " | " |
| Example 52 | Polyethylene | 3.2 | " | " | " | " | " | " |
| Example 53 | Polypropylene | " | " | " | " | " | " | " |

*1: DMDPS; dimethoxydiphenylsilane PTES; phenyltriethoxysilane TMPi; 2,2,6,6-tetramethylpiperadine
*2: ADMB; 1-allyl-3,4-dimethoxybenzene DMB; O-dimethoxybenzene
*3:⊚; Solid, almost no adhered matter; good powder flowability ○; Solid, little adhered matter, but good powder flowability X; Solid, lots of adhered matter, no powder flowability

TABLE 4 (2)

|  | Polymerization Conditions | | Results of Polymerization | | | | |
| --- | --- | --- | --- | --- | --- | --- | --- |
|  | Polymerization Temperature (° C.) | H$_2$ Amount (kg/cm$^2$) | MI (g/10 min) | HSP Portion | | Bulk Density (g/cc) | *3 Powder Properties |
|  |  |  |  | Amount (wt %) | [μ] (dl/g) |  |  |
| Example 39 | 70 | — | 0.07 | 35.1 | 1.95 | 0.33 | ◉ |
| Example 40 | " | — | " | 39.1 | 1.95 | 0.32 | ◉ |
| Example 41 | " | — | " | 25.0 | 1.77 | 0.34 | ◉ |
| Example 42 | " | — | " | 16.1 | 1.69 | 0.34 | ◉ |
| Example 43 | " | — | " | 34.2 | 1.98 | 0.33 | ◉ |
| Example 44 | " | — | " | 39.3 | 2.03 | 0.31 | ◉ |
| Example 45 | " | — | " | 36.2 | 1.53 | 0.32 | ◉ |
| Comp. Ex. 12 | " | — | " | 50.1 | 1.99 | N/A | X |
| Comp. Ex. 13 | " | — | " | 1.5 | 0.45 | 0.39 | ◉ |
| Example 46 | " | 0.2 | 1.1 | 38.7 | 1.90 | 0.29 | ○ |
| Example 47 | " | 0.4 | 7.1 | 40.4 | 1.81 | 0.28 | ○ |
| Example 48 | 75 | — | 0.07 | 37.8 | 1.89 | 0.30 | ◉ |
| Example 49 | 65 | — | " | 32.0 | 1.97 | 0.35 | ◉ |
| Example 50 | 70 | — | " | 35.0 | 1.96 | 0.33 | ◉ |
| Example 51 | " | — | " | 34.8 | 1.97 | 0.29 | ○ |
| Example 52 | " | — | " | 35.1 | 1.94 | 0.33 | ◉ |
| Example 53 | " | — | " | 34.3 | 1.96 | 0.33 | ◉ |

TABLE 5 (1)

|  | Catalyst Components | | | | | | | |
| --- | --- | --- | --- | --- | --- | --- | --- | --- |
|  | Component A | | *1 Component C | | *2 Component D | | Ti atom in (C)/(A) | (C)/(D) |
|  | (A-a) Kind | (A-a)/ (A-b) (wt/wt) | Kind | Amount (mmol) | Kind | Amount (mmol) | (mmol/ mmol) | (mmol/ mmol) |
| Example 54 | Polypropylene | 3.2 | ADMB | 0.15 | DPDMS | 0.23 | 7.6 | 0.33 |
| Example 55 | " | " | " | " | " | " | " | " |
| Example 56 | " | " | " | " | " | " | " | " |
| Example 57 | " | " | " | " | " | " | " | " |
| Example 58 | " | " | " | " | " | " | " | " |
| Example 59 | " | " | " | " | " | " | " | " |
| Comp. Ex. 14 | " | " | — | — | " | " | — | — |
| Example 60 | " | " | ADMB | 0.15 | " | " | 7.6 | 0.33 |
| Example 61 | " | " | " | " | " | " | " | " |
| Example 62 | " | " | " | " | " | " | " | " |

*1: ADMB = 1-allyl-3,4-dimethoxybenzene
*2: DPDMS = diphenyldimethoxysilane

TABLE 5 (2)

|  | Polymerizations Conditions | | | | | | |
| --- | --- | --- | --- | --- | --- | --- | --- |
|  | 1st Step Polymerization | | | 2nd Polymerization | | | |
|  | Polymerization Temperature (° C.) | Polymerization Time (hr) | H$_2$ (kg/ cm$^2$) | Polymerization Temperature (° C.) | Polymerization Time (hr) | H$_2$ (kg/ cm$^2$) | C$_2$/C$_3$ (mmol/ mmol) |
| Example 54 | 70 | 1.7 | 0 | 50 | 1.4 | 0 | 0.25 |
| Example 55 | " | " | " | " | 0.8 | " | " |

TABLE 5 (2)-continued

| | Polymerizations Conditions | | | | | | |
|---|---|---|---|---|---|---|---|
| | 1st Step Polymerization | | | 2nd Polymerization | | | |
| | Polymerization Temperature (° C.) | Polymerization Time (hr) | H₂ (kg/cm²) | Polymerization Temperature (° C.) | Polymerization Time (hr) | H₂ (kg/cm²) | C₂/C₃ (mmol/mmol) |
| Example 56 | " | " | " | " | 4.2 | " | " |
| Example 57 | " | " | " | " | 2.4 | " | " |
| Example 58 | " | " | " | " | 1.4 | " | 0.43 |
| Example 59 | " | " | " | " | " | " | 0.30 |
| Comp. Ex. 14 | " | " | " | " | " | " | 0.25 |
| Example 60 | " | " | " | " | " | 0.5 | " |
| Example 61 | " | " | 0.5 | " | " | 0.5 | " |
| Example 62 | " | " | 0.5 | " | " | 0.5 | " |

TABLE 6 (1)

| | Polymer Formation | | | | |
|---|---|---|---|---|---|
| | Polypropylene Component | | Copolymer Component | | |
| | | | | Ethylene | |
| | [η] (dl/g) | Amount (wt %) | [η] (dl/g) | Content (wt %) | Amount (wt %) |
| Example 54 | 3.86 | 65 | 4.81 | 31 | 35 |
| Example 55 | 3.82 | 75 | 4.75 | 30 | 25 |
| Example 56 | 3.89 | 45 | 4.80 | 29 | 55 |
| Example 57 | 3.85 | 55 | 4.77 | 30 | 45 |
| Example 58 | 3.86 | 70 | 4.65 | 40 | 30 |
| Example 59 | 3.80 | 65 | 4.80 | 25 | 35 |
| Comp. Ex. 14 | 4.01 | 65 | 4.35 | 30 | 35 |
| Example 60 | 3.65 | 70 | 1.75 | 31 | 30 |
| Example 61 | 1.76 | 72 | 5.19 | 30 | 28 |
| Example 62 | 1.74 | 79 | 1.77 | 30 | 21 |

TABLE 6 (2)

| | Physical Properties | | | | | | |
|---|---|---|---|---|---|---|---|
| | Melt Index MI (g/10 min) | Shore Hardness D Scale | Yield Stress (kg/cm²) | Fracture Stress (kg/cm²) | Elongation at Break (%) | Tensile Elasity (kg/cm²) | Izod Test Value (-20° C.) (kgcm/cm) |
| Example 54 | 0.1 | 55 | — | 200 | 500 | 2500 | NB |
| Example 55 | 0.1 | 53 | — | 250 | 520 | 3000 | NB |
| Example 56 | 0.1 | 50 | — | 100 | 480 | 1500 | NB |
| Example 57 | 0.1 | 50 | — | 110 | 420 | 2000 | NB |
| Example 58 | 0.1 | 55 | — | 210 | 550 | 2600 | NB |
| Example 59 | 0.1 | 54 | — | 200 | 530 | 2500 | NB |
| Comp. Ex. 14 | 0.1 | 90 | 220 | 60 | 100 | 13000 | 4.7 |
| Example 60 | 0.5 | 50 | — | 110 | 330 | 2000 | NB |
| Example 61 | 1.1 | 54 | 80 | 150 | 450 | 2800 | NB |
| Example 62 | 3.9 | 56 | 100 | 180 | 500 | 3700 | 5.1 |

[Industrial Applicability]

According to the first embodiment of the present invention, atactic polypropylene with high molecular weight and with narrow molecular weight distribution is blended with crystalline isotactic polypropylene in a specific ratio, to readily improve dynamic properties and hardness of the isotactic polypropylene and to obtain a less expensive, flexible polypropylene resin with excellent dynamic properties as thermoplastic elastomer without cross-linking treatment.

Further, according to the first embodiment of the present invention, propylene is polymerized by a gas phase one-step polymerization method or a slurry one-step polymerization method using a specific catalyst system, to obtain a less expensive, flexible polypropylene resin with dynamic properties which are about the same as those of partially cross-linked olefin based thermoplastic elastomer (TPO), without being subjected to cross-linking treatment.

These flexible polypropylene resins are superior in melting properties and are thus superior in injection-moldability as well as extrusion-moldability.

According to the second embodiment of the present invention, there is provided a less expensive, propylene based elastomer having practical tensile strength even when not vulcanized, good flexibility, and sufficient low temperature properties and low surface tackiness.

According to the third embodiment of the present invention, there is provided a less expensive, olefin polymer having practical tensile strength even when not vulcanized, good flexibility, and sufficient low temperature properties and low surface tackiness.

The flexible polypropylene resins and propylene based elastomers according to the present invention, can be molded into molded articles, by conventional molding techniques, which can be used for several applications.

In the case of injection-molding, molded articles can be suitably used as exterior parts for automotive because of good flexibility, good paintability, good moldability, good scuff resistance and good impact strength at low temperature. More specifically, the exterior parts include bumper, mole, mat guards for paint, side shields and spoilers.

In the case of hollow-molding, the molded articles can be suitably used as parts which are likely to have different wall thickness, when made from conventional polypropylene, such as snake body shape portion of a duct or materials for deep-drawing because of good moldability.

In the case of extrusion-molding, the molded articles can suitably used as sheets for under cover of engine because of good impact strength and good heat resistance. For example, ceiling materials, inner lining of a trunk room, surface skin material for inner panels. The molded articles can be used as insulating sheets in electrical part fields because of good processability and insulating properties. The molded articles can be used as flexible codes, booster cables and the like in electric cable fields because of good heat resistance, good weatherability and good anti-abrasion properties. The molded articles can also be used as water proof sheets, water stopping materials or filling materials in the construction or construction material fields.

The polypropylene resins can be used to make a laminate with the other resins to obtain sheets which meet several needs.

We claim:

1. A flexible propylene resin, which comprises:
   (x) 10 to 90 weight % of boiling heptane soluble polypropylene having an intrinsic viscosity of not less than 1.2 dl/g, and
   (y) 90 to 10 weight % of boiling heptane insoluble crystalline isotactic polypropylene having an intrinsic viscosity of 0.5 to 9.0 dl/g,
      said resin having a pentad fraction (rrrr/(1−mmmm)), measured by $^{13}$C-NMR, expressed as a percentage, of not less than 20%, and a domain structure which is observed by a transmission type electron microscope, all intrinsic viscosities being measured in a decaline solution at 135° C.

2. The flexible propylene resin according to claim 1, wherein said boiling heptane soluble polypropylene has an intrinsic viscosity of not less than 1.5 dl/g.

3. The flexible propylene resin according to claim 1, wherein said boiling heptane insoluble polypropylene has an intrinsic viscosity of 1.0 to 6.0 dl/g.

4. The flexible propylene resin according to claim 1, wherein said resin includes said boiling heptane soluble polypropylene in an amount of 25 to 70 weight % and said boiling heptane insoluble polypropylene in an amount of 30 to 75 weight %.

5. The flexible propylene resin according to claim 1, wherein said boiling heptane soluble polypropylene consists of homopolymers.

6. The flexible propylene resin according to claim 1, having an elongation at break of not less than 300%; a fracture stress of not less than 100 kg/cm$^2$; and a tensile elasticity of not more than 8000 kg/cm$^2$, when measured at a testing speed of 50 mm/min. at 23° C.

7. The flexible propylene resin according to claim 1, wherein said propylene resin is formed by polymerization in the presence of a catalyst system containing:
   (A) a solid component including (a) crystalline polyolefin and (b) a solid catalyst component consisting of magnesium, titanium, a halogen atom and an electron donor;
   (B) an organoaluminum compound;
   (C) an alkoxy group-containing aromatic compound represented by the general formula:

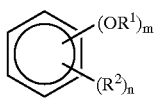

wherein R$^1$ is a C$_{1-20}$ alkyl group; R$^2$ is a C$_{1-10}$ hydrocarbon group, a hydroxy group or a nitro group; m is an integer of 1 to 6; and n is 0 or an integer of 1 to (6−m); and
   (D) an electron donative compound.

8. The flexible propylene resin according to claim 7, wherein said polymerization is a non-solvent polymerization.

9. The flexible propylene resin according to claim 7, wherein said solid catalyst component consists of Mg(OET)$_2$, TiCl$_4$, and di-n-butyl phthalate.

10. The flexible propylene resin according to claim 7, wherein said organoaluminum compound is AlEt$_3$.

11. The flexible propylene resin according to claim 7, wherein said alkoxy group-containing aromatic compound is 1-allyl-3,4-dimethoxybenzene.

12. The flexible propylene resin according to claim 7, wherein said electron donative compound is diphenyldimethoxysilane.

* * * * *